(12) United States Patent
Jung et al.

(10) Patent No.: US 9,220,143 B2
(45) Date of Patent: Dec. 22, 2015

(54) LED DIMMER, LED LIGHTING DEVICE COMPRISING SAME, AND METHOD FOR CONTROLLING DIMMING OF LED LIGHTING DEVICE

(71) Applicant: Seoul Semiconductor Co., Ltd., Ansan-si (KR)

(72) Inventors: Hye Man Jung, Ansan-si (KR); Hyun Gu Kang, Ansan-si (KR); Jin Cheol Shin, Ansan-si (KR); Sang Wook Han, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/397,472

(22) PCT Filed: Apr. 25, 2013

(86) PCT No.: PCT/KR2013/003576
§ 371 (c)(1),
(2) Date: Oct. 27, 2014

(87) PCT Pub. No.: WO2013/162308
PCT Pub. Date: Oct. 31, 2013

(65) Prior Publication Data
US 2015/0084541 A1   Mar. 26, 2015

(30) Foreign Application Priority Data

Apr. 25, 2012 (KR) .................. 10-2012-0043296
Apr. 25, 2013 (KR) .................. 10-2013-0046086

(51) Int. Cl.
*H05B 41/36* (2006.01)
*H05B 33/08* (2006.01)

(52) U.S. Cl.
CPC ........ *H05B 33/0845* (2013.01); *H05B 33/0815* (2013.01); *H05B 33/0824* (2013.01); *Y02B 20/343* (2013.01); *Y02B 20/346* (2013.01)

(58) Field of Classification Search
USPC ...... 315/209 R, 185 R, 186, 192, 193, 200 R, 315/201, 210, 224, 291, 297, 307, 311, 310, 315/312, 313, 362
See application file for complete search history.

(56) References Cited

U.S. PATENT DOCUMENTS 4,649,323 A    3/1987  Pearlman et al.
7,235,933 B1   6/2007  So
(Continued)

FOREIGN PATENT DOCUMENTS

JP   2009-110914   5/2009
KR   10-0970613    7/2010
(Continued)

OTHER PUBLICATIONS

International Search Report issued on Aug. 23, 2013 in International Application No. PCT/KR2013/003576.

*Primary Examiner* — Douglas W Owens
*Assistant Examiner* — Jianzi Chen
(74) *Attorney, Agent, or Firm* — H.C. Park & Associates, PLC

(57) ABSTRACT

A light-emitting diode (LED) dimmer for an LED lighting device, including a power switch, a drive voltage supply, and a LED light-emitting unit. Operating zones of the LED lighting device are changed in accordance with the switching of the power switch, and a dimming level for a next operating zone is determined on the basis of the dimming level and time while the power switch was on during the previous operating period.

19 Claims, 11 Drawing Sheets

(56) References Cited

U.S. PATENT DOCUMENTS

| | | |
|---|---|---|
| 2010/0060181 A1 | 3/2010 | Choi et al. |
| 2010/0148691 A1* | 6/2010 | Kuo et al. .................... 315/291 |
| 2011/0012530 A1* | 1/2011 | Zheng et al. ................. 315/294 |
| 2012/0126717 A1 | 5/2012 | Terazawa |
| 2012/0169243 A1* | 7/2012 | Lin et al. ................... 315/200 R |
| 2012/0242238 A1* | 9/2012 | Chen et al. ................ 315/200 R |

FOREIGN PATENT DOCUMENTS

| | | |
|---|---|---|
| KR | 10-2010-0096058 | 9/2010 |
| KR | 10-2011-0092156 | 8/2011 |
| KR | 10-2012-0009613 | 2/2012 |
| KR | 10-2012-0038501 | 4/2012 |

* cited by examiner

LED DIMMER, LED LIGHTING DEVICE COMPRISING SAME, AND METHOD FOR CONTROLLING DIMMING OF LED LIGHTING DEVICE

CROSS-REFERENCE TO RELATED APPLICATIONS

This application is the National Stage of International Application PCT/KR2013/003576, filed on Apr. 25, 2013, and claims priority from and the benefit of Korean Patent Application No. 10-2012-0043296, filed on Apr. 25, 2012 and Korean Patent Application No. 10-2013-0046086, filed on Apr. 25, 2013, which are incorporated herein by reference for all purposes as if fully set forth herein.

BACKGROUND

1. Field

The present invention relates to an LED dimmer, an LED lighting device including the same and a method for controlling dimming of the LED light emitting device, and more particularly to an LED dimmer capable of controlling luminance of an LED light emitting device according to switching operation of a power switch, an LED lighting device including the same, and a method for controlling dimming of the LED light emitting device.

2. Discussion of the Background

Dimming operation of a light emitting diode (LED) refers to operation of changing luminance or brightness of an LED lighting device according to external disturbance applied thereto, and an LED dimmer refers to a device that performs a dimming control function within such an LED lighting device. Such an LED dimmer is provided to an LED lighting device in order to reduce power consumption of the LED in the LED lighting device while securing efficient operation thereof.

Particularly, heat generated from the LED due to continuous light emission of the LED causes deterioration in efficiency of lighting operation. In addition, although use of DC voltage for the LED lighting device does not require separate rectification operation and allows the LED lighting device to directly employ line power, there is a limit in application.

On the other hand, use of alternating current power requires separate rectification operation for efficiency improvement in power use and allows the LED lighting device to perform light emitting operation using a rectified DC voltage. Particularly, an LED lighting device employing an LED has a problem in terms of efficient use of applied AC power. Particularly, luminance or power supply of the LED lighting device must be controlled according to user input, operation conditions, or states of the LED lighting device.

In order to control luminance of such a lighting device, various types of dimmers are used. In addition, to receive user input for controlling luminance of the lighting device, various dimmer switches are used. As such a dimmer switch, a dial-type dimmer switch capable of controlling not only on/off of the lighting device but also a dimming level thereof is broadly used in the art. When such a dial-type dimmer switch is used, the dimming level of the lighting device is determined by a user adjusting the dial-type dimmer switch, and luminance control of the lighting device can be easily performed according to the determined dimming level. However, a lighting device configured to control only on/off of the lighting device using a non-dial-type switch (for example, a button type switch, a latch type switch, and the like) requires dimming control, but has a problem of difficulty in dimming control.

Accordingly, various techniques for performing dimming control of the lighting device using the non-dial-type switch, that is, techniques relating to the switch dimmer, have been actively developed. One example of conventional techniques relating to the switch dimmer is disclosed in U.S. Pat. No. 4,649,323 (Patent Document) entitled "MICROCOMPUTER-CONTROLLED LIGHT SWITCH", in which luminance of the lighting device is controlled using a pair of non-latch type switches. More specifically, the invention (Conventional Technique 1) disclosed in Patent Document 1 is configured to increase or decrease luminance of the lighting device by determining the case where one of switches is pushed for a long period of time as a "preset" mode based on a pushed state of the switches, and to store luminance of the lighting device at a point of time when no switch is pushed by a user. In addition, Conventional Technique 1 is configured such that, when one of the switches is pushed for a short period of time (that is, when the switch is tapped), current luminance of the lighting device can be changed to a preset level, a full-on level, and an off level depending upon the pushed switch (a luminance increase switch or a luminance decrease switch). However, such Conventional Technique 1 has problems in that i) a user must perform a separate preset setting process; ii) two switches dedicated for dimming are required; iii) this technique can be applied only to a button type switch and cannot be applied to a latch type switch; iv) it is necessary to measure a period of time for which the switch is pushed by a user; v) this technique does not allow accurate control of luminance, and the like. On the other hand, in order to solve the aforementioned problems, U.S. Pat. No. 7,235,933 (Patent Document 2) entitled "REVERSIBLE DIMMER DEVICE OF GAS DISCHARGE LAMPS AND THE CONTROL METHOD FOR LIGHT ADJUSTING THEREOF" discloses a technique capable of controlling luminance of a lighting device using a single power switch that can turn on/off power input to the lighting device. The invention (Conventional Technique 2) disclosed in Patent Document 2 is configured to detect a state of the power switch in response to user manipulation and to control luminance of the lighting device according to state variation of the power switch. More specifically, Conventional Technique 2 controls luminance of the lighting device based on the number of On/Off times and timing by recognizing the case where the power switch is rapidly turned off/on in a short period of time in response to user manipulation as a user command for luminance control. However, Conventional Technique 2 is a lighting device based on sensing of power switch off-time and has a problem in that this technique requires a power storage device for power supply to a logic control circuit during off-time. That is, since Conventional Technique 2 necessarily includes the power storage device such as a capacitor, there are problems in that the lighting device has a complicated circuit configuration, is difficult to achieve size reduction, and has short lifespan due to short lifespan of the capacitor. On the other hand, as another example of the lighting device based on off-time sensing, US Patent Publication No. 2010/0148691 (Patent Document 3) entitled "DRIVING CIRCUIT WITH DIMMING CONTROLLER FOR DRIVING LIGHT SOURCES" discloses a dimming control technique that is very similar to Conventional Technique 2. FIG. 1 is a block diagram of an LED lighting device according to an invention (Conventional Technique 2) disclosed in Patent Document 3. As shown in FIG. 1, the lighting device according to Conventional Technique 3 includes a power switch 04, an AC/DC converter 06, dimming controller 08, a power converter 10, an LED string 12, and a current sensor 14. The power switch 04 serves to selectively apply AC voltage to the LED lighting device in response to user manipulation, and the AC/DC converter 06 outputs DC voltage by converting the input AC voltage into the DC voltage through full-wave rectification by a bridge diode, and the power converter 10 receives and stabilizes the DC voltage to supply stabilized power to the LED string 12. With regard to dimming control function of the LED lighting device according to Conventional Technique 3, dimming controller 08 is configured to monitor an operation state of the power switch 04 by monitoring whether DC voltage is input from the AC/DC converter 06, and to change the dimming level each time of detecting turn-off operation of the power switch 04. That is, in Conventional Technique 3, dimming controller 08 is configured to change a counter value each time of detecting that the power switch 04 is turned off, and to perform dimming control of the LED lighting device according to a changed counter value when the power switch is turned on again. To perform this function, dimming controller 08 of Conventional Technique 3 must be maintained in a driven state while the power switch 04 is turned off, that is, during off-time, and thus the LED lighting device of Conventional Technique 3 includes a capacitor C10 configured to supply power to dimming controller 08 during off-time. However, Conventional Technique 3 has problems in that i) since it is necessary to detect the operation state of the power switch 04, the lighting device has a complicated circuit configuration; and in that ii) since the lighting device necessarily includes an energy charge/discharge device, such as a capacitor and the like, for supplying operation power to dimming controller 08 during off-time, the LED lighting device has a complicated circuit configuration, is difficult to reduce in size, has short lifespan due to short lifespan of the capacitor, and requires high manufacturing costs. Moreover, Conventional Technique 3 has problems in that (iii) since input power passes through the capacitor that is a power source in an off-state, discordance between input current and input voltage causes decrease of power factor (PF) and increase of total harmonic distortion (THD); and (iv) since dimming controller 08 must perform sensing operation prior to other operations when the power switch 04 is turned on and supply power again, time delay occurs in operation stabilization of the LED lighting device, causing very unstable operation due to rapid variation of power.

PRIOR DOCUMENTS (Patent Document 1) U.S. Pat. No. 4,649,323
(Patent Document 2) U.S. Pat. No. 7,235,933
(Patent Document 3) US Patent Publication No. 2010/0148691
(Patent Document 4) JP Patent Publication No. 2009-110914.

SUMMARY

The present invention has been conceived to solve such problems in the related art.

It is an aspect of the present invention to provide an LED lighting device that can control luminance using a non-dial-type switch.

It is another aspect of the present invention to provide an LED lighting device that does not require separate sensing operation during off-time.

It is further aspect of the present invention to provide an LED lighting device that does not require a separate off-time power source for supplying drive power to a control signal generation unit, which performs luminance control of the LED lighting device, during off-time.

It is yet another aspect of the present invention to provide an LED lighting device that measures on-time of the LED lighting device to maintain user-preferred luminance through automatic determination of the user-preferred luminance.

Features of the present invention for achieving the above and other objects and advantageous effects of the invention will be hereinafter described.

In accordance with one aspect of the present invention, there is provided an LED dimmer for dimming control of an LED lighting device including a power switch, a drive voltage supply and an LED light-emitting unit, wherein, when operating zones of the LED lighting device are changed due to switching of the power switch in response to user manipulation, the LED dimmer selects a different dimming level of an operating zone after switching of the power switch (hereinafter, referred to as the "$(k+1)^{th}$ operating zone", k being a positive integer) than the dimming level in an operating zone before switching of the power switch (hereinafter, referred to as the "$k^{th}$ operating zone"), and controls luminance of the LED light-emitting unit according to the selected dimming level in the $k^{th}$ operating zone.

Preferably, the LED dimmer includes a dimming level group consisting of a first dimming level to an $n^{th}$ dimming level (n being a positive integer of 2 or higher), which are sequentially constructed and stored according to sizes of the dimming levels, and sequentially changes the dimming level within the dimming level group and controls luminance of the LED light-emitting unit in a specific operating zone according to the changed dimming level, as the operating zones are changed due to switching of the power switch.

Preferably, when the power switch is turned on to start the $k^{th}$ operating zone, a target dimming level is set to an $i^{th}$ dimming level (i being a positive integer of n or less), and the LED dimmer reads the target dimming level, controls luminance of the LED light-emitting unit according to the $i^{th}$ dimming level read as the target dimming level in the $k^{th}$ operating zone, and sets the target dimming level to an $(i+1)^{th}$ dimming level immediately after controlling luminance of the LED light-emitting unit according to the $i^{th}$ dimming level.

Preferably, the LED dimmer measures power switch on-time as soon as the power switch is turned on to start the $k^{th}$ operating zone, and sets the target dimming level to the $(i+1)^{th}$ dimming level at a time point that the measured power switch on-time reaches a preset first reference time.

Preferably, the LED dimmer measures power switch on-time as soon as the power switch is turned on to start the $k^{th}$ operating zone, and resets the target dimming level, which has been set to the $(i+1)^{th}$ dimming level, to the $i^{th}$ dimming level at a time point that the measured power switch on-time reaches a preset second reference time.

Preferably, the LED dimmer measures power switch on-time as soon as the power switch is turned on to start the $k^{th}$ operating zone, sets the target dimming level to the $(i+1)^{th}$ dimming level at a time point that the measured power switch on-time reaches a preset first reference time, and resets the target dimming level, which has been set to the $(i+1)^{th}$ dimming level, to the $i^{th}$ dimming level at a time point that the measured power switch on-time reaches a preset second reference time, wherein the second reference time is greater than the first reference time.

In accordance with another aspect of the present invention, there is provided an LED lighting device, which includes: a power switch connected between an AC power source and a rectification unit and selectively outputting AC voltage supplied from the AC power source in response to user manipulation; a drive voltage supply connected to the power switch, generating drive voltage through rectification of the AC voltage output through the power switch, and outputting the drive voltage to an LED light-emitting unit and an LED dimmer; the LED dimmer selecting a different dimming level of an operating zone after switching of the power switch (hereinafter, referred to as the "$(k+1)^{th}$ operating zone", k being a positive integer) than the dimming level in an operating zone before switching of the power switch (hereinafter, referred to as the "$k^{th}$ operating zone"), and controlling luminance of the LED light-emitting unit according to the selected dimming level in the $k^{th}$ operating zone, when operating zones of the LED lighting device are changed due to switching of the power switch in response to user manipulation; and the LED light-emitting unit emitting light under control of the LED dimmer.

Preferably, the drive voltage supply includes a rectification unit performing full-wave rectification of the AC voltage and outputting a full-wave rectified voltage to the LED light-emitting unit and the LED dimmer.

Preferably, the LED dimmer includes a dimming level group consisting of a first dimming level to an $n^{th}$ dimming level (n being a positive integer of 2 or higher), which are sequentially constructed and stored according to sizes of the dimming levels, and sequentially changes the dimming level within the dimming level group and controls luminance of the LED light-emitting unit in a specific operating zone according to the changed dimming level, as the operating zones are changed due to switching of the power switch.

Preferably, when the power switch is turned on to start the $k^{th}$ operating zone, a target dimming level is set to an $i^{th}$ dimming level (i being a positive integer of n or less), and the LED dimmer reads the target dimming level, controls luminance of the LED light-emitting unit according to the $i^{th}$ dimming level read as the target dimming level in the $k^{th}$ operating zone, and sets the target dimming level to an $(i+1)^{th}$ dimming level immediately after controlling luminance of the LED light-emitting unit according to the $i^{th}$ dimming level.

Preferably, the LED dimmer measures power switch on-time as soon as the power switch is turned on to start the $k^{th}$ operating zone, and sets the target dimming level to the $(i+1)^{th}$ dimming level at a time point that the measured power switch on-time reaches a preset first reference time.

Preferably, the LED dimmer measures power switch on-time as soon as the power switch is turned on to start the $k^{th}$ operating zone, and resets the target dimming level, which has been set to the $(i+1)^{th}$ dimming level, to the $i^{th}$ dimming level at a time point that the measured power switch on-time reaches a preset second reference time.

Preferably, the LED dimmer measures power switch on-time as soon as the power switch is turned on to start the $k^{th}$ operating zone, sets the target dimming level to the $(i+1)^{th}$ dimming level at a time point that the measured power switch on-time reaches a preset first reference time, and resets the target dimming level, which has been set to the $(i+1)^{th}$ dimming level, to the $i^{th}$ dimming level at a time point that the measured power switch on-time reaches a preset second reference time.

In accordance with a further aspect of the present invention, there is provided a control method for dimming control of an LED light emitting device including a power switch, a drive voltage supply, an LED dimmer, and an LED light-emitting unit, which includes: (a) determining whether the power switch is turned on in response to user manipulation; (b) when the power switch is turned on, reading a preset target dimming level and starting control of luminance of the LED light-emitting unit according to the read dimming level to start a $k^{th}$ operating zone (k being a positive integer); (c) changing the target dimming level to a dimming level next to the read dimming level, immediately after starting control of luminance of the LED light-emitting unit; and (d) determining whether the power switch is turned off in response to user manipulation, and finishing the $k^{th}$ operating zone when it is determined that the power switch is turned off, wherein the target dimming level changed and set in Step (c) becomes a dimming level in a $(k+1)^{th}$ operating zone.

Preferably, the LED dimmer includes a dimming level group consisting of a first dimming level to an $n^{th}$ dimming level (n being a positive integer of 2 or higher), which are sequentially constructed and stored according to sizes of the dimming levels, and the method further includes: sequentially changing the dimming level within the dimming level group and controlling luminance of the LED light-emitting unit in a specific operating zone according to the changed dimming level, as the operating zones are changed due to switching of the power switch by performing Steps (a) to (d).

Preferably, when a $(k-1)^{th}$ operating zone preceding Step (a) is finished, the target dimming level is set to an $i^{th}$ dimming level (i being a positive integer of n or less) in the $k^{th}$ operating zone, Step (b) includes reading the target dimming level when the $k^{th}$ operating zone starts, and starting control of luminance of the LED light-emitting unit according to the $i^{th}$ dimming level read as the target dimming level, and Step (b) includes setting the target dimming level to an $(i+1)^{th}$ dimming level.

Preferably, Step (b) includes measuring power switch on-time as soon as the power switch is turned on to start the $k^{th}$ operating zone, and Step (c) includes setting the target dimming level to the $(i+1)^{th}$ dimming level at a time point that the measured power switch on-time reaches a preset first reference time.

Preferably, Step (b) includes measuring power switch on-time as soon as the power switch is turned on to start the $k^{th}$ operating zone, and Step (c) includes resetting the target dimming level, which has been set to the $(i+1)^{th}$ dimming level, to the $i^{th}$ dimming level at a time point that the measured power switch on-time reaches a preset second reference time.

Preferably, Step (b) includes measuring power switch on-time as soon as the power switch is turned on to start the $k^{th}$ operating zone, and Step (c) includes (c-1) setting the target dimming level to the $(i+1)^{th}$ dimming level at a time point that the measured power switch on-time reaches a preset first reference time, and (c-2) resetting the target dimming level, which has been set to the $(i+1)^{th}$ dimming level, to the $i^{th}$ dimming level at a time point that the measured power switch on-time reaches a preset second reference time, wherein the second reference time is longer than the first reference time.

According to the present invention, it is possible to achieve efficient luminance control of the LED lighting device using a non-dial-type switch.

In addition, according to the present invention, since there is no need for separate sensing operation during off-time, there can be an advantageous effect of providing an LED lighting device that does not require a separate off-time power source for supplying drive power to a control signal generation unit, which performs luminance control of the LED lighting device, during off-time.

Further, according to the present invention, there can be an advantageous effect of providing an LED lighting device that measures on-time of the LED lighting device to maintain user-preferred luminance through automatic determination of the user-preferred luminance.

The present invention is not limited to these effects, and other effects not mentioned above will become apparent to those skilled in the art from the following detailed description of the present invention.

DETAILED DESCRIPTION OF THE ILLUSTRATED EMBODIMENTS

Figure 1:
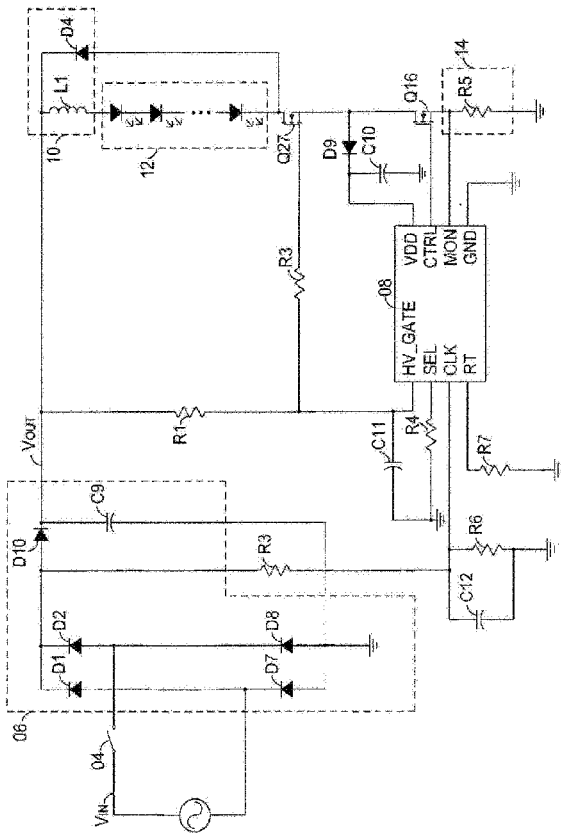
FIG. 1 is a block diagram of one example of an LED lighting device in the related art.

The present invention will be described more fully hereinafter with reference to the accompanying drawings, in which exemplary embodiments of the invention are illustrated. These embodiments will be described such that the invention can be easily realized by a person having ordinary knowledge in the art. Here, although various embodiments are disclosed herein, it should be understood that these embodiments are not intended to be exclusive. For example, individual structures, elements or features of a particular embodiment are not limited to that particular embodiment and can be applied to other embodiments without departing from the spirit and scope of the invention. In addition, it should be understood that locations or arrangements of individual components in each of the embodiments may be changed without departing from the spirit and scope of the present invention. Therefore, the following embodiments are not to be construed as limiting the invention, and the present invention should be limited only by the claims and equivalents thereof. Like components having the same or similar functions will be denoted by like reference numerals.

Now, exemplary embodiments of the invention will be described in detail with reference to the accompanying drawings so as to be easily realized by a person having ordinary knowledge in the art.

EXEMPLARY EMBODIMENTS OF THE PRESENT INVENTION

As used herein, the term "operating zone" of an LED lighting device means a zone from a time point that a power switch is turned on and rectified voltage is supplied to an LED light-emitting unit in response to user manipulation to a time point that the power switch is turned off and the rectified voltage is not supplied to the LED light-emitting unit in response to user manipulation. That is, in embodiments of the present invention, the term "operating zone" of the LED lighting device means a time zone in which the LED light-emitting unit of the LED lighting device is turned on and then turned off once in response to user manipulation. Thus, the term "current operating zone" means a state that the power switch is turned on and the LED lighting device is currently being driven, and the term "next operating zone" means a zone from a time point that the power switch is turned off and driving of the LED lighting device is stopped to a time point that the power switch is turned on again and driving of the LED lighting device is resumed, with reference to the "current operating zone". In addition, as used herein, the terms "first operating zone" and "second operating zone" are used as concepts for distinguishing a temporal sequence of the operating zones instead of defining operations zones at specific time points or in specific zones. Thus, with reference to the first operating zone, the second operating zone means an operating zone following the first operating zone, and with reference to the second operating zone, the first operating zone means an operation preceding the second operating zone in time.

Further, as used herein, "switching of a power switch" means that the power switch is turned on and then turned off in response to user manipulation. Accordingly, once switching of the power switch means that the power switch is turned on once and then turned off once, and twice switching of the power switch means that the power switch is turned on once and then turned off once after once switching of the power switch. Accordingly, the operating zones of the LED lighting device are distinguished from each other by switching of the power switch.

Further, as used herein, the term "target dimming level" means a dimming level referred to as a dimming level in a certain operating zone upon start of the corresponding zone, that is, at a time point that the power switch is turned on from an off state to allow power supply to the LED lighting device in response to user manipulation. Namely, the LED lighting device according to the present invention controls luminance of the LED light-emitting unit according to the dimming level, which is determined by reading once the target dimming level set at a time point that the power switch is turned on to supply power in response to user manipulation, that is, at a time point that a new operating zone starts, and then determining the read target dimming level as the dimming level for the corresponding operating zone. Accordingly, even when the target dimming level is changed after dimming control starts in the corresponding operating zone, there is no influence on the dimming level of the corresponding operating zone, and the changed target dimming level affects the dimming level of the next operating zone.

Further, as used herein, the term "power switch on-time $T_{on}$" means a period of time from a time point that the power switch is turned on in response to user manipulation to a time point that the power switch is turned off again. Thus, the term "power switch on-time" is the same concept as the operation time of the LED lighting device for the "operating zone" of the LED lighting device, and may be compatibly used herein.

Further, as used herein, the term "first reference time $T_{set1}$" means a critical power switch on-time for setting the dimming level of the next operating zone, that is, the target dimming level, to be different from the dimming level of the current operating zone.

Further, as used herein, the term "second reference time $T_{set2}$" means a critical power switch on-time for setting the dimming level of the next operating zone, that is, the target dimming level, to be the same as the dimming level of the current operating zone. Preferably, the second reference time $T_{set2}$ is set to be longer than the first reference time $T_{set1}$.

Further, it should be understood that, as used herein, the terms "first", "second", and "third" are only used to distinguish components from one another instead of defining the components.

Further, as used herein, terms such as V1, V2, V3, . . . , t1, t2, t3 . . . , and the like are relative values indicating certain voltages, certain time points, and the like to distinguish from one another, and are not used to indicate absolute values.

Figure 2:
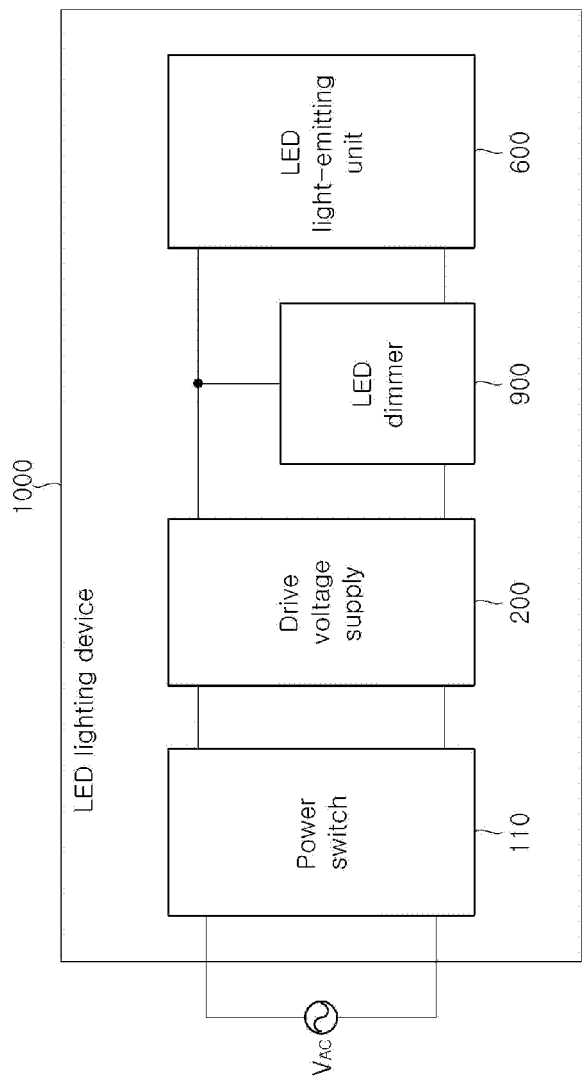
FIG. 2 is a schematic block diagram of an LED lighting device according to one embodiment of the present invention.

Overview of LED Lighting Device According to One Embodiment of the Present Invention FIG. 2 is a schematic block diagram of an LED lighting device according to one embodiment of the present invention. First, an luminance control function of an LED lighting device 1000 according to the present invention will be briefly described with reference to FIG. 2. The present invention is aimed at allowing a user to control luminance of the LED lighting device 1000 simply and intuitively by manipulating only the power switch 110. That is, the LED lighting device 1000 according to the present invention may be configured to perform dimming control by recognizing switching of the power switch 110 in response to user manipulation as a kind of dimming control command. On the other hand, although the present invention will hereinafter be described with reference to the LED lighting device employing an LED as a light source for convenience of description and better understanding, it should be understood that the present invention is not limited to the LED lighting device 1000 and may also be applied to various lighting devices employing various light sources, and it will be apparent to those skilled in the art that such modifications, changes and alterations fall within the spirit and scope of the present invention.

To perform such a function, the LED lighting device 1000 according to the present invention may include the power switch 110, a drive voltage supply 200, an LED dimmer 900, and an LED light-emitting unit 600.

According to the present invention, the power switch 110 is placed between an AC power source $V_{AC}$ and the drive voltage supply 200, and is turned on/off in response to user manipulation such that AC voltage $V_{in}$ can be selectively supplied from the AC power source $V_{AC}$ to the drive voltage supply 200. As such a power switch 110, any one of various non-dial-type switches may be used. Herein, for convenience of description and better understanding, the present invention will be described with reference to embodiments wherein the power switch 110 is realized by a latch type switch. However, it should be understood that the present invention is not limited thereto.

According to the present invention, the drive voltage supply 200 converts AC voltage $V_{in}$ supplied from the AC power source $V_{AC}$ through the power switch 110 into drive voltage suited to driving of the LED light-emitting unit 600, and supplies the converted drive voltage to the LED dimmer 900 and the LED light-emitting unit 600. As such a drive voltage supply 200, one of drive voltage supply circuits such as an SMPS circuit, a half-wave rectification circuit, a full-wave rectification circuit, and the like, which are well-known in the art, may be employed as needed. Herein, for convenience of description and better understanding, the present invention will be described with reference to embodiments wherein the drive voltage supply 200 is composed of four diodes. However, it should be understood that the present invention is not limited thereto and any features including the subject matter of the present invention fall within the scope of the present invention irrespective of the configuration of the drive voltage supply 200. Accordingly, the present invention will be described with reference to embodiments wherein rectified voltage $V_{rec}$ is supplied as the drive voltage to the LED light-emitting unit 600.

According to the present invention, the LED light-emitting unit 600 may include at least one LED and emit light when receiving the drive voltage from the drive voltage supply 200. In addition, the LED light-emitting unit 600 allows drive current $I_{dr}$ to be controlled by the LED dimmer 900 such that luminance of the LED light-emitting unit 600 can be controlled.

According to the present invention, the LED dimmer 900 perform dimming control by recognizing a switching mode of the power switch 110 in response to user manipulation as a kind of dimming control command with respect to the LED lighting device 1000 and controlling the drive current $I_{dr}$ flowing through the LED light-emitting unit 600 according to the recognized dimming control command. Hereinafter, a dimming control method of the LED dimmer 900 according to the present invention will be described in more detail.

Fundamental Dimming Control Algorithm of LED Dimmer 900 According to the Present Invention Fundamentally, the LED dimmer 900 according to the present invention changes a dimming level of the LED lighting device 1000 each time that the power switch 110 is switched in response to user manipulation. Namely, the LED dimmer 900 changes the dimming level of the LED lighting device 1000 each time that the LED lighting device 1000 is turned off and then turn on again. Since luminance of the LED lighting device 1000 is controlled to a different dimming level by the LED dimmer 900 each time that the LED lighting device 1000 is turned off and then turn on again, when a user wants to change luminance of the LED lighting device 1000, it is possible to select a target dimming level by switching the power switch 110 until the dimming level reaches the target dimming level (that is, by manipulating the power switch to turn off and then turn on the LED lighting device 1000.

To perform this function, the LED dimmer 900 according to the present invention stores n (n being a positive integer of 2 or higher) dimming levels, and controls the dimming level of the LED lighting device 1000 by selecting a different dimming level according to a predetermined algorithm each time that the LED lighting device 1000 is turned off and then turn on again according to switching of the power switch 110. More specifically, the n dimming levels are sequentially constructed depending upon the sizes of the dimming levels and stored in the LED dimmer 900, and the LED dimmer 900 selects a dimming level next to a dimming level of a previous operating zone among the n dimming levels sequentially constructed and stored therein and controls the dimming level of the LED lighting device 1000 in a current operating zone according to the selected dimming level, each time that the LED lighting device 1000 is turned off and then turn on again according to switching of the power switch 110 in response to user manipulation.

Although such a dimming control algorithm can be realized in various ways, the LED dimmer 900 according to one embodiment of the invention may perform dimming control of the LED lighting device 1000 according to the dimming control algorithm described hereinafter. When the power switch 110 is turned on in response to user manipulation, the LED dimmer 900 reads a preset target dimming level and performs dimming control according to the read target dimming level. Accordingly, the target dimming level read upon turn-on of the power switch 110 becomes the dimming level of the current operating zone and is not changed until the power switch 110 is turned off. On the other hand, when dimming control starts according to the target dimming level (that is, when the LED dimmer 900 starts dimming control of the LED lighting device 1000 according to the target dimming level), the LED dimmer 900 sets and stores a dimming level next to the dimming level of the current operating zone as the target dimming level in the next operating zone. Accordingly, when the power switch 110 is turned off to finish the current operating zone in response to user manipulation and is then turned on to start the next operating zone in response to user manipulation, the LED dimmer 900 controls luminance of the LED lighting device 1000 for the corresponding operating zone according to the target dimming level stored therein. By way of example, assume an embodiment in which the LED dimmer 900 according to the present invention stores a first dimming level (100% of maximum luminance), a second dimming level (50% of maximum luminance), and a third dimming level (5% of maximum luminance) and can perform dimming control in three stages of the first to third dimming levels. In addition, assume that the power switch 110 is in an off state and the target dimming level is set to the first dimming level. In this case, when the power switch 110 is turned on in response to user manipulation, rectified voltage $V_{rec}$ is supplied to the LED dimmer 900 and the LED light-emitting unit 600, whereby the LED dimmer 900 starts to operate and the LED lighting device 1000 enters a new operating zone. The LED dimmer 900 reads a preset target dimming level. Here, since the current target dimming level is the first dimming level, the LED dimmer 900 determines the first dimming level as the dimming level of the current operating zone and controls LED drive current $I_{dr}$ such that the LED light-emitting unit 600 can be driven according to the first dimming level, thereby performing dimming control of the LED lighting device 1000. Dimming control according to the first dimming level is performed until the power switch 110 is turned off in response to user manipulation to finish the current operating zone. In addition, as soon as (or immediately after) dimming control starts according to the first dimming level, the LED dimmer 900 sets the second dimming level, which is next to the first dimming level corresponding to the dimming level of the current operating zone, as the target dimming level. Thus, at a time point that the power switch 110 is turned off to finish the corresponding operating zone in response to user manipulation, the target dimming level stored in the LED dimmer 900 becomes the second dimming level. As a result, when the power switch 110 is turned on again in response to user manipulation (that is, when the next operating zone starts), the LED dimmer 900 controls luminance of the LED lighting device 1000 according to the second dimming level set as the target dimming level. Likewise, when the power switch 110 is turned on with the target dimming level set to the second dimming level, the LED dimmer 900 determines the second dimming level as the dimming level of the current operating zone and performs dimming control, while changing the target dimming level to the third dimming level. Further, when the power switch 110 is turned on with the target dimming level set to the third dimming level, the LED dimmer 900 determines the third dimming level as the dimming level of the current operating zone and performs dimming control, while changing the target dimming level to the first dimming level. In this way, the LED dimmer 900 according to the present invention may perform dimming control of the LED lighting device 1000 according to the different dimming levels for the respective operating zones, when the operating zones of the LED lighting device 1000 are changed (that is, when the LED lighting device 1000 is turned off and then turned on again) according to switching of the power switch 110 (that is, according to switching operation of the power switch 110 by which the power switch 110 is turned on again after a predetermined period of time elapses from a time point that the power switch is turned off in response to user manipulation. On the other hand, in the LED lighting device 1000 constructed as described above, since the dimming levels of the LED lighting device 1000 are changed only by switching of the power switch 110, there is no need for a separate timer for measuring power switch on-time (that is, operating time of the LED lighting device), thereby simplifying the structure of the LED lighting device 1000.

Algorithm for Effective Switching Determination of LED Dimmer 900 According to the Present Invention On the other hand, the LED dimmer 900 according to the present invention may prevent excessively rapid switching of the power switch 110 from being recognized as an effective dimming control command. This structure of the LED dimmer is provided to prevent damage to various components inside the LED lighting device 1000 due to rapid power switching while maintaining current luminance, for example, in the event that misbehaving children rapidly switch the power switch 110.

To provide such a function, the LED dimmer 900 according to the present invention measures power switch on-time $T_{on}$ for which the power switch 110 is maintained in an on state after the power switch 110 is turned on in response to user manipulation, and sets/stores a target dimming level in the next operating zone as the next dimming level following the current dimming level of the LED lighting device 1000 only in the case where the measured power switch on-time $T_{on}$ is greater than or equal to a preset first reference time $T_{set1}$. Thus, when the power switch is turned off in a state that the power switch on-time $T_{on}$ is less than the first reference time $T_{set1}$, the current dimming level of the LED lighting device 1000 is maintained as the target dimming level, and thus the LED dimmer 900 controls luminance of the LED lighting device 1000 according to the same dimming level as that of the previous operating zone in the next operating zone. On the other hand, when the power switch is turned off in a state that the power switch on-time $T_{on}$ is greater than or equal to the first reference time $T_{set1}$, the next dimming level following the current dimming level of the LED lighting device 1000 is set/stored as the target dimming level at a time point that the power switch on-time $T_{on}$ reaches the preset first reference time $T_{set1}$, and thus the LED dimmer 900 controls the luminance of the LED lighting device 1000 according to the next dimming level following the dimming level of the previous operating zone in the next operating zone. By way of example, in the case where the power switch on-time Ton is less than the first reference time $T_{set1}$ in a state that dimming control of the LED lighting device 1000 is performed according to the first dimming level, when the power switch 110 is turned off, the LED dimmer 900 maintains the first dimming level as the target dimming level of the next operating zone instead of changing the target dimming level to the second dimming level, since the power switch on-time $T_{on}$ does not reach the first reference time $T_{set1}$. Accordingly, when the power switch 110 is turned on again to start the next operating zone, the LED dimmer 900 performs dimming control of the LED lighting device 1000 according to the first dimming level set as the target dimming level. On the other hand, when the power switch on-time $T_{on}$ reaches the first reference time $T_{set1}$ in the state that dimming control of the LED lighting device 1000 is performed according to the first dimming level, the LED dimmer 900 changes the target dimming level of the next operating zone from the first dimming level corresponding to the dimming level of the current operating zone to the second dimming level next to the first dimming level, and stores the second dimming level. Accordingly, when the power switch 110 is turned off at a time point that the power switch on-time $T_{on}$ is greater than or equal to the first reference time $T_{set1}$, the LED lighting device 1000 is turned off in a state that the target dimming level is set to the second dimming level by the LED dimmer 900. Thus, when the power switch 110 is turned on again to start the next operating zone in response to user manipulation, the LED dimmer 900 performs dimming control of the LED lighting device 1000 according to the second dimming level set as the target dimming level, whereby dimming control is performed according to the dimming level of the current operating zone that is different from that of the previous operating zone.

Preferred Illumination Determination Algorithm of LED Dimmer 900 According to the Present Invention On the other hand, the LED dimmer 900 may discriminate and maintain user-preferred luminance in the next operating zone irrespective of switching of the power switch 110. When a user maintains specific luminance for a long period of time, this luminance can be intuitively regarded as user-preferred luminance. Thus, in consideration of such characteristic, the LED dimmer 900 according to the present invention may identify and maintain user-preferred luminance. That is, when the power switch on-time $T_{on}$ is greater than or equal to a preset second reference time $T_{set2}$, the LED dimmer 900 according to the present invention maintains the dimming level of the current operating zone as the target dimming level of the next operating zone, thereby allowing dimming control of the LED lighting device 1000 to be performed according to the same dimming level as that of the current operating zone even in the next operating zone.

By way of example, as in the aforementioned embodiment in which the LED dimmer 900 may perform three stages of dimming control including the first dimming level to the third dimming level, assume that the current power switch 110 is turned off and the target dimming level is set to the first dimming level. In this case, when the power switch 110 is turned on in response to user manipulation, the rectified voltage $V_{rec}$ is supplied to the LED dimmer 900 and the LED light-emitting unit 600, whereby the LED dimmer 900 starts to operate. Then, the LED dimmer 900 reads the target dimming level, which is set to the first dimming level, and determines the first dimming level as the dimming level of the current operating zone, and controls dimming of the LED lighting device 1000 according to the first dimming level. At the same time, the LED dimmer 900 changes and sets the target dimming level to the second dimming level, and starts to measure the power switch on-time Ton by operating a timer. When the power switch on-time $T_{on}$ reaches the second reference time $T_{set2}$, the LED dimmer 900 determines the dimming level of the current operating zone, that is, the first dimming level, as user-preferred luminance, and changes and sets the target dimming level, which has been set to the second dimming level, to the first dimming level again. Accordingly, when the power switch 110 is turned off in response to user manipulation at a time point that the power switch on-time Ton is greater than or equal to the second reference time $T_{set2}$, the target dimming level set at this time point becomes the first dimming level, which is the dimming level of the current operating zone. Thus, when the power switch is turned on again to start the next operating zone, the LED dimmer 900 controls luminance of the LED lighting device 1000 according to the first dimming level, which is the dimming level of the previous operating zone. On the other hand, when the power switch 110 is turned off in response to user manipulation at a time point that the power switch on-time Ton is less than the second reference time $T_{set2}$, the target dimming level set at this time point becomes the second dimming level, which is next to the first dimming level corresponding to the dimming level of the current operating zone. Accordingly, in this case, when the power switch is turned on again to start the next operating zone, the LED dimmer 900 controls luminance of the LED lighting device 1000 according to the second dimming level, which is next to the first dimming level corresponding to the dimming level of the previous operating zone. In this way, the LED dimmer 900 according to the present invention may determine user-preferred luminance and may maintain the dimming level of the current operating zone even in the next operating zone when the dimming level of the current operating zone is the user-preferred luminance.

In the above description, a dimming control algorithm of the LED dimmer 900 based on once switching of the power switch 110 has been described. However, the LED dimmer 900 according to the present invention may analyze various switching modes of the power switch 110 and perform dimming control of the LED lighting device 1000 by recognizing the analyzed switching modes of the power switch as user dimming control input. For example, when switching of the power switch 110 is repeated a preset number of times in response to user manipulation within a third preset reference time, the LED dimmer 900 may recognize such a switching mode of the power switch 110 as dimming control input for transition to a preset specific dimming level, and may allow unconditional transition to the preset dimming level. That is, the most important technical feature of the LED dimmer 900 according to the present invention is in that the switching modes of the power switch 110 (a time point of switching, power switch on-time, the number of switching times, and the like) in response to user manipulation may be used as the user dimming control input. Here, it should be noted that the user dimming control input according to the switching modes may be constructed in various ways, as needed. Accordingly, it will be apparent to those skilled in the art that various modifications and changes fall within the scope of the present invention so long as the modifications and changes maintain the subject matter of the present invention by employing the switching modes of the power switch 110 as the user dimming control input.

Next, referring to FIG. 3 to FIG. 12, exemplary embodiments of the LED dimmer 900 according to the present invention and the LED lighting device 1000 including the same will be described in detail. For convenience of description and better understanding, the following description will be provided with reference to the embodiment wherein the LED dimmer 900 performs three stages of dimming control including first to third dimming levels, and performs dimming control through all of the fundamental dimming control algorithm by switching of the power switch 110, the effective switching determination algorithm and the preferred luminance determination algorithm. However, it will be apparent to those skilled in the art that the LED dimmer 900 according to the present invention may perform dimming control using the fundamental dimming control algorithm alone, perform dimming control using only the fundamental dimming control algorithm and the effective switching determination algorithm, or perform dimming control using only the fundamental dimming control algorithm and the preferred luminance determination algorithm.

Figure 3:
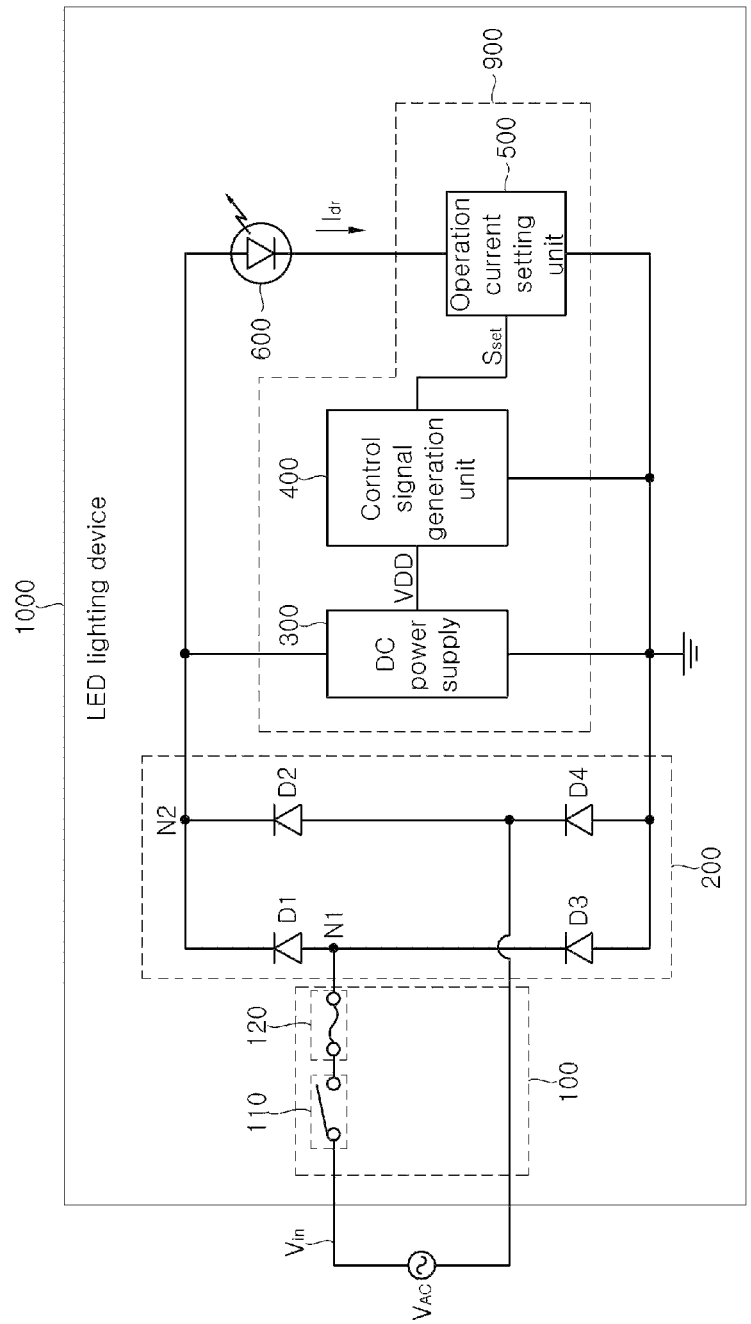
FIG. 3 is a block diagram of an LED lighting device according to a first embodiment of the present invention.

Configuration and Function of LED Lighting Device According to First Embodiment of the Present Invention FIG. 3 is a block diagram of an LED lighting device 1000 according to a first embodiment of the present invention. An LED dimmer 900 according to the first embodiment of the invention may generate and output a pulse width modulated signal having a certain duty ratio according to a dimming level as a dimming control signal (Sset). The LED dimmer 900 has similar functions to those of the LED dimmer described with reference to FIG. 2.

As shown in FIG. 3, the LED lighting device 1000 according to this embodiment may include an AC power supply 100, a rectification unit 200, the LED dimmer 900, and an LED light-emitting unit 600. In addition, according to the first embodiment, the LED dimmer 900 may include a DC power supply 300, a control signal generation unit 400, and an operation current setting unit 500.

The AC power supply 100 may include a power switch 110. As described above, the power switch 110 is placed between an AC power source $V_{AC}$ and the rectification unit 200 and is turned on/turned off in response to user manipulation such that AC voltage Vin can be selectively supplied from the AC power source $V_{AC}$ to the rectification unit 200. The AC power source $V_{AC}$ may be a general domestic power source, an industrial power source, or an AC power source passing through a particular power controller. For example, the AC power source $V_{AC}$ may be a general domestic power source having an RMS value of 220V at a frequency of 60 Hz. In addition, the power switch 110 may be realized in various ways. For example, on/off operation of the power switch may be performed directly by a user or may be performed in a specific mode by a predetermined mechanism included in the power switch. When performed in the specific mode, the operation of the power switch may be realized through a separate sensor for sensing surrounding luminance and the like. Herein, a latch type switch will be described as the power switch 110.

By the on/off operation power switch 110, AC power is supplied to a first node N1 which corresponds to an output terminal of the AC power supply 100 for a specific period of time. That is, while the power switch 110 is maintained in an on state, an AC power waveform is provided to the first node N1. If the power switch 110 is turned off in response to user manipulation, supply of the AC power is blocked.

In addition, a fuse 120 may be further disposed between the power switch 110 and the first node N1. The fuse 120 prevents damage to the LED lighting device 1000 due to overcurrent. Further, although not shown in the drawings, the AC power supply 100 may include various circuit protection elements and/or protective circuits, such as an EMI filter, a barrister, and the like.

The rectification unit 200 may be a full-wave rectification circuit composed of four diodes D1 to D4, as shown in FIG. 3. The rectification unit 200 performs full-wave rectification of the AC voltage Vin and outputs a full-wave rectified voltage $V_{rec}$ to the LED dimmer 900 and the LED light-emitting unit 600. Accordingly, when the AC voltage $V_{AC}$ has a sine waveform, the rectification unit 200 outputs only the voltage of a positive voltage level through full wave rectification. That is, the voltage of a positive voltage level is provided to a second node N2 that corresponds to an output terminal of the rectification unit 200. Here, the output of the rectification unit 200 follows the output of the AC power supply 100 in terms of timing. That is, only while the power switch 110 of the AC power supply 100 is in an on state, the rectification unit 200 performs full-wave rectification of the AC voltage output from the AC power supply 100.

The DC power supply 300 and the LED light-emitting unit 600 are connected in parallel to the second node N2 corresponding to the output terminal of the rectification unit 200 to receive the rectified voltage $V_{rec}$ from the rectification unit 200.

As described above, the LED dimmer 900 according to the first embodiment may include the DC power supply 300, the control signal generation unit 400, and the operation current setting unit 500.

The DC power supply 300 constituting part of the LED dimmer 900 reduces a voltage level of the rectified voltage $V_{rec}$, which is input to drive the LED dimmer 900, such that the rectified voltage becomes DC voltage VDD generally having a smooth voltage level. The DC voltage VDD output from the DC power supply 300 is supplied as drive voltage to the control signal generation unit 400.

In addition, the control signal generation unit 400 receives the DC voltage VDD from the DC power supply 300. Further, the control signal generation unit 400 generates a dimming control signal $S_{set}$ according to a selected dimming level. Dimming control signal $S_{set}$ output from the control signal generation unit 400 according to the first embodiment is provided in the form of a pulse width modulated signal.

Specifically, as described in FIG. 2, the control signal generation unit 400 according to the first embodiment may determine a dimming level of the current operating zone based on switching of the power switch 110 in response to user manipulation, generate dimming control signal $S_{set}$ based on the determined dimming level, and output dimming control signal $S_{set}$ to the operation current setting unit 500. More specifically, the control signal generation unit 400 may generate and output dimming control signal $S_{set}$ according to a different dimming level to the operation current setting unit 500 each time that the power switch 110 is switched in response to user manipulation (that is, each time that the power switch 110 is turned off from an on state to finish the first operating zone in response to user manipulation and then turned on to start the second operating zone in response to user manipulation). Here, it should be noted that the first operating zone and the second operating zone are used as concepts for distinguishing a temporal sequence of the operating zones instead of defining operations zones at specific time points or in specific zones. Thus, when switching of the power switch 110 is performed in response to user manipulation while the control signal generation unit 400 controls the dimming level of the LED lighting device 1000 according to the first dimming level in the first operating zone, the control signal generation unit 400 may control the dimming level of the LED lighting device according to the second dimming level in the second operating zone. In addition, as described above, the control signal generation unit 400 may further determine whether the switching operation of the power switch 110 is valid or invalid based on the first reference time $T_{set1}$ to determine whether to change the dimming level. Further, as described above, the control signal generation unit 400 according to the present invention may further determine user-preferred luminance based on the second reference time $T_{set2}$ and may determine whether to change the dimming level based on the determination result. A detailed operation of the control signal generation unit 400 according to the present invention will be described below with reference to FIG. 5 to FIG. 7.

Dimming control signal $S_{set}$ generated by the control signal generation unit 400 is input to the operation current setting unit 500. The operation current setting unit 500 sets drive current $I_{dr}$ of the LED light-emitting unit 600 in response to the input dimming control signal $S_{set}$. To this end, the operation current setting unit 500 is electrically connected to a cathode of the light-emitting unit 600.

The LED light-emitting unit 600 may include at least one light emitting element. Particularly, the LED light-emitting unit 600 may include an LED and may be realized in a structure in which a plurality of LEDs is connected to each other in series, in parallel, or in a combination of series and parallel. Further, although FIG. 3 shows that a single operation current setting unit 500 is provided to a single LED light-emitting unit 600, the single operation current setting unit 500 may be provided to two or more LED light-emitting units 600. Further, a plurality of LED light-emitting units 600 may be arranged in parallel such that the operation current setting unit 500 may be provided to cathodes of the LED light-emitting units 600, respectively.

The LED light-emitting unit 600 receives voltage of the second node N2 corresponding to the output terminal of the rectification unit 200 and emits light, luminance of which corresponds to the drive current $I_{dr}$ set by the operation current setting unit 500.

Figure 4:
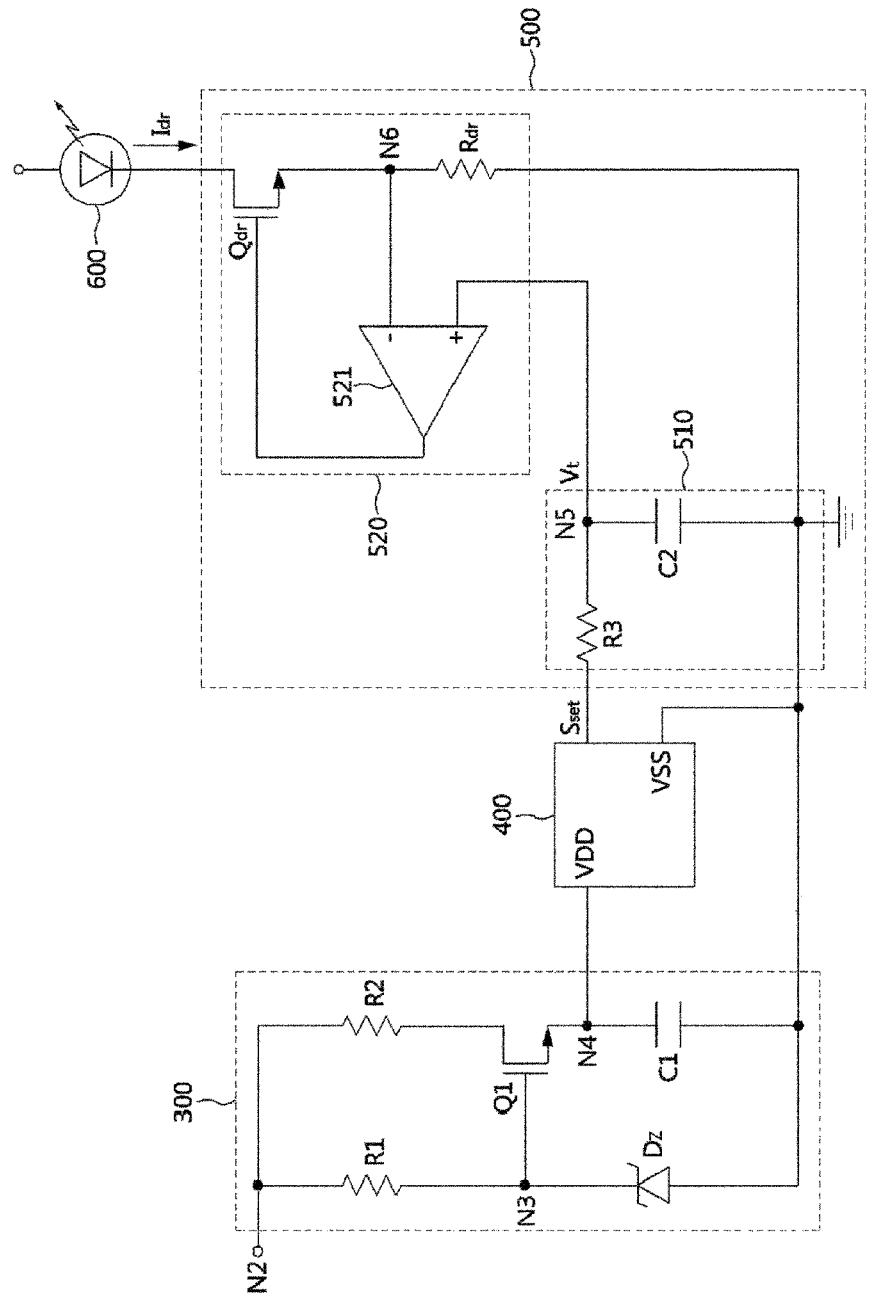
FIG. 4 is a circuit diagram of the LED lighting device according to the first embodiment of the invention, illustrating operation of an AC power supply, a control signal generation unit, and an operation current setting unit.

FIG. 4 is a circuit diagram of the LED lighting device according to the first embodiment of the invention, illustrating operation of the DC power supply 300, the control signal generation unit 400 and the operation current setting unit 500.

Referring to FIG. 4, the DC power supply 300 acts as a voltage regulator. The DC power supply 300 is used to supply operation power of the control signal generation unit 400 and may be implemented by any configuration capable of generating DC voltage.

As shown in FIG. 4, the DC power supply 300 may include two resistors R1, R2, a Zener diode Dz, a transistor Q1, and a capacitor C1. The voltage of the second node N2 corresponding to the output terminal of the rectification unit 200 is applied to the resistors R1, R2. The resistor R1 is connected between the second node N2 and a third node N3, and the resistor R2 is connected between the second node N2 and the transistor Q1. In addition, the Zener diode Dz is connected between the third node N3 and ground. The transistor Q1 is connected between the resistor R2 and a fourth node N4, and a gate of the transistor is connected to the third node N3. The transistor Q1 may be composed of an n-type MOSFET. The capacitor C1 is placed between the fourth node N4 and ground.

When voltage from the rectification unit 200 to the transistor Q1 is greater than or equal to a threshold voltage of the transistor Q1, the transistor Q1 is turned on and a current passage is formed through the second node N2, the resistor R2, the transistor Q1 and the capacitor C1. As a result, a voltage level is increased in the capacitor C1 due to accumulation of electric charges. In addition, voltage reduction occurs in the resistor R2 and current flowing through the transistor Q1 corresponds to the reduced voltage, whereby electric charges are accumulated in the capacitor C1. In this operation, the resistor R2 may be used as an element for voltage reduction and may prevent application of high voltage or peak voltage to a drain of the transistor Q1 through voltage reduction.

The aforementioned operation is continued until the voltage level at the fourth node N4 corresponding to a source of the transistor Q1 reaches a breakdown voltage of the Zener diode Dz. That is, even at the breakdown voltage of the Zener diode Dz, the transistor Q1 is turned on and the voltage level at the fourth node N4 corresponding to one electrode of the capacitor C1 is a value obtained by subtracting the threshold voltage from the breakdown voltage. As the transistor Q1 is turned on, charge accumulation at the fourth node N4 is continued, whereby the voltage at the fourth node N4 increases and the transistor Q1 is turned off. Accordingly, additional charge accumulation does not occur in the capacitor C1. As a result, the voltage level at the fourth node N4 becomes a value obtained by subtracting the threshold voltage of the transistor Q1 from the breakdown voltage of the Zener diode Dz.

If the second node N2 is floated or has a ground level, additional charge accumulation does not occur at the fourth node N4 and the transistor Q1 is also turned off. Accordingly, the voltage at the fourth node N4 is caused by electric charges accumulated upon turn-on of the transistor Q1. In addition, when the power switch 110 of the AC power supply 100 is turned off, the voltage level at the third node N3 is less than the ground level or the breakdown voltage.

The aforementioned operation refers to limiting operation for maintaining an applied voltage at a constant level. Accordingly, any circuit configuration capable of performing the voltage regulating or limiting operation may be used as the DC power supply 300 according to the present invention.

In addition, an output voltage of the DC power supply 300 may be used as the drive voltage VDD of the control signal generation unit 400.

Figure 6:
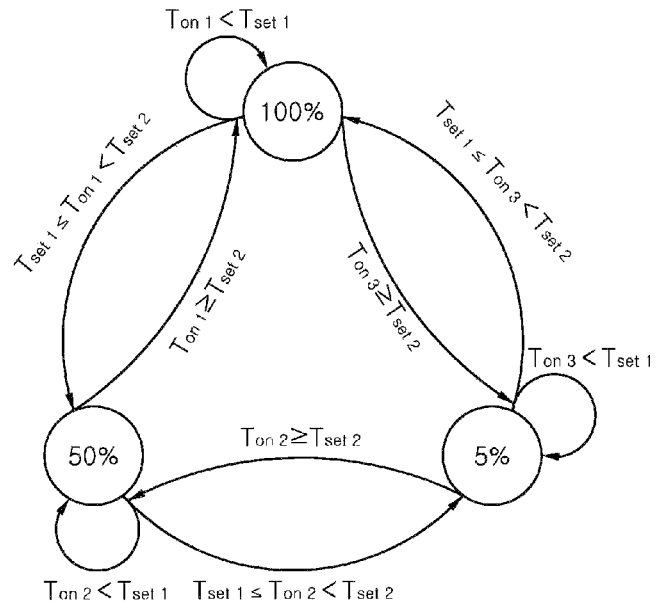
FIG. 6 is a state view illustrating operation of the control signal generation unit according to the first embodiment of the invention.
Figure 7:
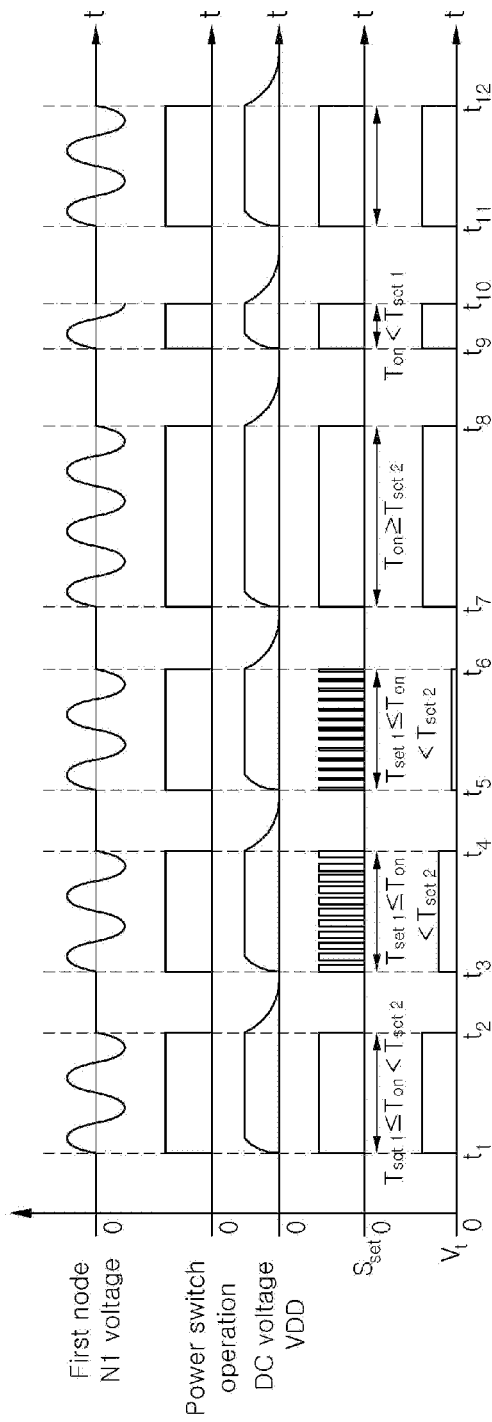
FIG. 7 is a timing view illustrating operation of the LED lighting device according to the first embodiment of the invention.

On the other hand, Table 1 shows relationship between a dimming level of the current operating zone (first operating zone) of the LED lighting device 1000 in operation and a dimming level of the next operating zone (second operating zone) of the LED lighting device 1000 based on the power switch on-time $T_{on}$, the first reference time $T_{set1}$ and the second reference time $T_{set2}$. In addition, FIG. 6 is a state view illustrating operation of the control signal generation unit according to the first embodiment of the invention, and FIG. 7 is a timing view illustrating operation of the LED lighting device according to the first embodiment of the invention.

Next, the dimming control algorithm of the control signal generation unit 400 according to the present invention will be described in more detail with reference to FIG. 6 and FIG. 7.

TABLE 1

| Dimming level of first operating zone | Dimming level of second operating zone | | |
| --- | --- | --- | --- |
| | $T_{on} < T_{set1}$ | $T_{set1} \leq T_{on} < T_{set2}$ | $T_{set2} \leq T_{on}$ |
| First dimming level | First dimming level | Second dimming level | First dimming level |
| Second dimming level | Second dimming level | Third dimming level | Second dimming level |
| Third dimming level | Third dimming level | First dimming level | Third dimming level |

In Table 1, the power switch on-time $T_{on}$ refers to a temporal length of the first operating zone of the LED lighting device 1000. That is, in Table 1, the power switch on-time $T_{on}$ means a period of time from a time point that the power switch 110 is turned on to start the first operating zone in response to user manipulation to a time point that the power switch 110 is turned off to finish the first operating zone in response to user manipulation. As shown in Table 1, the dimming level of the second operating zone is determined based on the dimming level of the first operating zone and the power switch on-time $T_{on}$ in the first operating zone.

Hereinafter, the dimming control algorithm of the control signal generation unit 400 will be described with reference to the case where the dimming level of the first operating zone is the first dimming level. Here, the expression 'the dimming level of the first operating zone is the first dimming level' means that the power switch 110 is turned off in a state that the first dimming level is set as the target dimming level of the first operating zone in an operating zone preceding the first operating zone. Accordingly, in this state, that is, in the state that the target dimming level is set to the first dimming level, when the power switch 110 is turned on to supply the drive voltage to the control signal generation unit 400 in response to user manipulation, the control signal generation unit 400 reads the target dimming level. Here, since the target dimming level is set to the first dimming level, the control signal generation unit 400 generates a dimming control signal $S_{set}$ corresponding to the first dimming level and outputs dimming control signal $S_{set}$ to the operation current setting unit 500, thereby performing dimming control of the LED lighting device 1000 for the first operating zone. In addition, at the same time, the control signal generation unit 400 starts to measure the power switch on-time $T_{on}$. When the measured power switch on-time $T_{on}$ reaches the first reference time $T_{set1}$, the control signal generation unit 400 sets the target dimming level to the second dimming level corresponding to the dimming level next to the first dimming level that is the current dimming level. That is, at a time point that the power switch on-time $T_{on}$ reaches the first reference time $T_{set1}$, the target dimming level in the second operating zone is set differently from the dimming level of the first operating zone. Accordingly, when the power switch 110 is turned off to finish the first operating zone at a time point that the power switch on-time $T_{on}$ is less than the first reference time $T_{set1}$, the target dimming level at a time point of starting the first operating zone and the target dimming level at a time point of finishing the first operating zone are the same first dimming level. Accordingly, in this case, even when the power switch 110 is turned on again to start the second operating zone in response to user manipulation, the control signal generation unit 400 performs dimming control of the LED lighting device 1000 in the second operating zone according to the first dimming level as in the first operating zone. On the other hand, when the power switch 110 is turned off to finish the first operating zone at a time point that the power switch on-time $T_{on}$ is greater than or equal to the first reference time $T_{set1}$ and less than the second reference time $T_{set2}$, the target dimming level at the time point of starting the first operating zone is the first dimming level and the target dimming level at the time point of finishing the first operating zone is the second dimming level, and thus are different from each other. Accordingly, in this case, when the power switch 110 is turned on again to start the second operating zone in response to user manipulation, the control signal generation unit 400 performs dimming control of the LED lighting device 1000 in the second operating zone according to the second dimming level, which is the target dimming level at the time point of finishing the first operating zone. In addition, when the first operating zone is continued until the power switch on-time $T_{on}$ reaches the second reference time $T_{set2}$, the control signal generation unit 400 determines the dimming level of the first operating zone as user-preferred luminance. Thus, the control signal generation unit 400 changes and sets the target dimming level, which has been set to the second dimming level, to the current dimming level, that is, the first dimming level. Accordingly, when the power switch 110 is turned off to finish the first operating zone at a time point that the power switch on-time $T_{on}$ is greater than or equal to the second reference time $T_{set2}$, the target dimming level at the time point of starting the first operating zone and the target dimming level at the time point of finishing the first operating zone are the same first dimming level. Accordingly, in this case, even when the power switch 110 is turned on again to start the second operating zone in response to user manipulation, the control signal generation unit 400 performs dimming control of the LED lighting device 1000 in the second operating zone according to the first dimming level as in the first operating zone. When the dimming level of the first operating zone is the second dimming level and the dimming level of the first operating zone is the third dimming level, the control signal generation unit 400 performs dimming control in a similar manner. FIG. 6 schematically shows a target dimming level setting algorithm of the control signal generation unit 400 according to the first embodiment of the invention. On the other hand, FIG. 7 shows six operating zones including a first operating zone (t1~t2), a second operating zone (t3~t4), a third operating zone (t5~t6), a fourth operating zone (t7~t8), a fifth operating zone (t9~t10) and a sixth operating zone (t11~t12), a voltage level of the first node (N1), an operation state of the power switch 110, a dimming control signal $S_{set}$ output from the control signal generation unit 400 in a corresponding operating zone, control voltage $V_f$, and the like. In the timing view of FIG. 7, the target dimming level of the first operating zone is set to the first dimming level. Thus, when the power switch 110 is turned on to start the first operating zone in response to user manipulation at a time point t1, the control signal generation unit 400 generates and outputs a dimming control signal $S_{set}$, which corresponds to the first dimming level set as the target dimming level, to the operation current setting unit 500. As described above, dimming control signal $S_{set}$ output from the control signal generation unit 400 is a pulse width modulated signal having a predetermined duty ratio corresponding to the dimming level. Since the first dimming level is a dimming level corresponding to 100% of maximum luminance, the pulse width modulated signal output from the control signal generation unit 400 has a duty ratio of 100%. In addition, at the time point t1, the power switch on-time $T_{on}$ starts to be measured. At a time point t2, the power switch 110 is turned off in response to user manipulation, whereby the first operating zone is finished. Since the power switch on-time $T_{on}$ of the first operating zone is greater than or equal to the first reference time $T_{set1}$ and less than the second reference time $T_{set2}$, the target dimming level at the time point of finishing the first operating zone is the second dimming level. Accordingly, at a time point t3, when the power switch 110 is turned on again to start the second operating zone in response to user manipulation, the control signal generation unit 400 generates and outputs dimming control signal $S_{set}$, which corresponds to the second dimming level set as the target dimming level, to the operation current setting unit 500. As can be seen from FIG. 7, dimming control signal $S_{set}$ output from the control signal generation unit 400 in the second operating zone is a pulse width modulated signal having a duty ratio of 50%, which corresponds to the second dimming level. Accordingly, in the second operating zone, dimming control of the LED lighting device 1000 is performed according to the second dimming level. As shown in FIG. 7, since the power switch on-time $T_{on}$ of the second operating zone is greater than or equal to the first reference time $T_{set1}$ and less than the second reference time $T_{set2}$, the target dimming level at a time point t4 that the second operating zone is finished is the third dimming level. Accordingly, in the third operating zone, dimming control of the LED lighting device 1000 is performed according to the third dimming level. Further, as shown in the drawing, since the power switch on-time $T_{on}$ of the third operating zone is greater than or equal to the first reference time $T_{set1}$ and less than the second reference time $T_{set2}$, the target dimming level at a time point t6 that the third operating zone is finished is the first dimming level. Accordingly, in the fourth operating zone, dimming control of the LED lighting device 1000 is performed according to the first dimming level. On the other hand, unlike the first operating zone to the third operating zone, the power switch on-time $T_{on}$ in the fourth operating zone is greater than or equal to the second reference time $T_{set2}$. Accordingly, based on the aforementioned algorithm, the dimming level of the fourth operating zone, that is, the first dimming level, is determined as user-preferred luminance, and the first dimming level is maintained as the target dimming level at a time point t8 that the fourth operating zone is finished. Accordingly, in the fifth operating zone, dimming control of the LED lighting device 1000 is performed according to the first dimming level as in the fourth operating zone. Further, unlike the first operating zone to the fourth operating zone, the power switch on-time $T_{on}$ in the fifth operating zone is less than the first reference time $T_{set1}$. Accordingly, at a time point t10 that the fifth operating zone is finished, the first dimming level is maintained as the target dimming level. As a result, in the sixth operating zone, dimming control of the LED lighting device 1000 is performed according to the first dimming level as in the fifth operating zone.

Referring again to FIG. 4, the operation current setting unit 500 according to the present invention may receive dimming control signal $S_{set}$ output from the control signal generation unit 400 and set the drive current $I_{dr}$ of the LED light-emitting unit 600. The operation current setting unit 500 may include a control voltage generator 510 and a current driver 520.

The control voltage generator 510 includes a resistor R3 and a capacitor C2. In some embodiments, the control voltage generator may omit the resistor R3. However, when dimming control signal $S_{set}$ is provided in the form of the pulse width modulated signal and includes high frequencies, the resistor R3 enables filtering of the high frequencies. Thus, a predetermined level of control voltage $V_t$ is generated at a fifth node N5. The control voltage $V_t$ is applied to the current driver 520.

By operation of the current driver 520, dimming control signal $S_{set}$, which is the pulse width modulated signal, is changed to a predetermined level of DC voltage. Here, the control voltage $V_t$ at the fifth node N5 is determined according to the duty ratio of dimming control signal $S_{set}$ which is the pulse width modulated signal. A high duty ratio will provide a high level of control voltage $V_t$ through charge accumulation in the capacitor C2 and a low duty ratio will provide a low level of control voltage $V_t$.

The current driver 520 receives the control voltage $V_t$ and determines the drive current $I_{dr}$ of the LED light-emitting unit 600. To perform such a function, the current driver 520 may include a linear amplifier 521, a drive transistor Qdr, and a drive resistor Rdr. The control voltage $V_t$ is applied to a non-inverting input terminal of the linear amplifier 521 and a voltage at a sixth node N6 is applied to an inverting input terminal thereof. The drive transistor Qdr is connected between the LED light-emitting unit 600 and the sixth node N6. A gate of the drive transistor Qdr is connected to an output terminal of the linear amplifier 521. In addition, the drive resistor Rdr is connected between the sixth node N6 and ground.

If a certain level of control voltage $V_t$ is applied and the voltage at the sixth node N6 has a lower voltage level than the control voltage $V_t$, the linear amplifier 521 outputs a positive voltage level, whereby the drive transistor Qdr is turned on. Accordingly, the drive current $I_{dr}$ flowing through the drive transistor Qdr increases. As the drive current $I_{dr}$ increases, the voltage at the sixth node N6 is increased by the drive resistor Rdr. Increase in voltage at the sixth node N6 is continued until the voltage becomes substantially the same as the control voltage $V_t$. That is, the voltage at the sixth node N6 follows the control voltage $V_t$.

Alternatively, the linear amplifier 521 may be replaced by a comparator.

Consequently, the control voltage $V_t$ determines the voltage at the sixth node N6 and determines the drive current $I_{dr}$ through the drive resistor Rdr. The drive current $I_{dr}$ flowing through the drive transistor Qdr is $V_t/R_s$.

For example, in Table 1, the control voltage $V_t$ according to the first dimming level has a high voltage level, which generates a high drive current $I_{dr}$. In addition, the control voltage $V_t$ according to the second dimming level has a lower voltage level than the first dimming level of the control voltage $V_t$, whereby the drive current $I_{dr}$ is also reduced, thereby reducing luminance of the LED light-emitting unit 600. Likewise, the control voltage $V_t$ according to the third dimming level has a lower voltage level than the first dimming level and the second dimming level of the control voltage Vt, whereby the drive current $I_{dr}$ is also reduced, thereby reducing luminance of the LED light-emitting unit 600.

Figure 5:
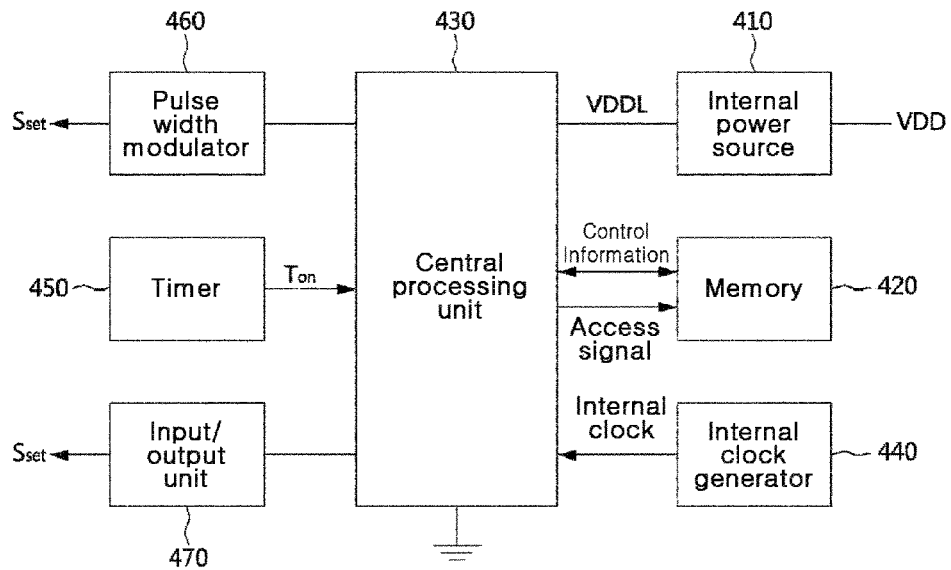
FIG. 5 is a block diagram of the control signal generation unit according to the first embodiment of the invention.

FIG. 5 is a block diagram of the control signal generation unit 400 according to the first embodiment of the invention. Referring to FIG. 5, the control signal generation unit 400 may include an internal power source 410, a memory 420, a central processing unit 430, an internal clock generator 440, a timer 450, a pulse width modulator 460, and an input/output unit 470.

The internal power source 410 receives and regulates DC voltage VDD output from the DC power supply 300. The regulated voltage VDDL is used as internal power of the control signal generation unit. In some embodiments, the control signal generation unit may omit the internal power source 410.

The memory 420 stores and outputs a target dimming level under control of the central processing unit 430. Thus, the target dimming level is stored at a specific address in the memory by writing, or may be output therefrom by reading in response to an access signal of the central processing unit 430. Such a memory 420 may be realized by an electrically erasable programmable read-only memory (EEPROM) which can store information even when power is not supplied thereto.

The central processing unit 430 receives a clock signal from the internal clock generator 440 and performs determination and processing operation with respect to the target dimming level. In addition, the central processing unit receives time information from the timer 450 and uses the time information in processing and determination of the target dimming level. Particularly, the central processing unit 430 accesses the memory 420 to write or read the dimming level in the memory 420.

The internal clock generator 440 generates a clock signal of the control signal generation unit. The generated clock signal is individually supplied to the memory 420, the central processing unit 430, the timer 450, the pulse width modulator 460 and the input/output unit 470, or may be supplied to the respective elements as different clocks in a processed form through the central processing unit 430.

The timer 450 measures time through a counter circuit and the like. Particularly, in this embodiment, the timer 450 measures power switch on-time $T_{on}$, which is a period of time for which power is supplied by turning on the power switch. The time information is input into the central processing unit 430.

The pulse width modulator 460 performs pulse width modulation based on a dimming level input from the central processing unit 430, and generates/outputs a dimming control signal $S_{set}$, the pulse width of which is modulated. Such pulse width modulation may be performed through adjustment of the duty ratio under the same frequency conditions.

Further, the input/output unit 470 outputs dimming control signal $S_{set}$ in the form of a digital signal based on control information input from the central processing unit 430. In this embodiment, operation of the input/output unit 470 may be disabled by the central processing unit 430. As the input/output unit 470 is disabled, the pulse width modulator 460 may be enabled.

In the memory 420, a target dimming level for generating a dimming control signal $S_{set}$ with respect to a certain operating zone upon turn-on of the power switch 110, that is, upon start of the corresponding operating zone, is stored. The central processing unit 430 sends an access signal of a read command and determines the target dimming level output from the memory 420.

The central processing unit 430 compares power switch on-time $T_{on}$ input from the timer 450 with a preset first reference time $T_{set1}$ and a preset second reference time $T_{set2}$.

If the power switch on-time $T_{on}$ measured by the timer 450 is less than the first reference time $T_{set1}$, the central processing unit 430 maintains the target dimming level stored in the memory 420. When the power switch on-time $T_{on}$ measured by the timer 450 reaches the first reference time $T_{set1}$, the central processing unit 430 changes the target dimming level stored in the memory 420 to a dimming level next to the dimming level of the current operating zone and stores the changed dimming level. Further, when the power switch on-time $T_{on}$ measured by the timer 450 reaches the second reference time $T_{set2}$, the central processing unit 430 again changes the target dimming level stored in the memory 420 from the dimming level next to the dimming level of the current operating zone to the dimming level of the current operating zone, and stores and maintains the dimming level of the current operating zone as the target dimming level. This operation is carried out as shown in Table 1.

The aforementioned operation may be realized in various ways.

For example, at each of specific addresses of the memory 420, corresponding dimming levels are constructed and stored. Specifically, a first dimming level corresponding to a duty ratio of 100% is stored in a first address; a second dimming level corresponding to a duty ratio of 50% is stored in a second address; and a third dimming level corresponding to a duty ratio of 5% is stored in a third address. As a result, the target dimming level may be set in such a way that an address is designated for a specific dimming level.

For example, it is assumed that a target dimming level is stored at the first address at a time point of finishing a previous operating zone. When the power switch 110 is turned on to start an operating zone, the central processing unit 430 accesses the first address and outputs the dimming level stored at the first address as the dimming level of the current operating zone. The power switch on-time $T_{on}$ measured by the timer 450 is compared with the first reference time $T_{set1}$ and the second reference time $T_{set2}$ by the central processing unit 430 and it is determined based on the comparison result whether to change the address for setting the target dimming level. When the power switch 110 is turned off in a state that the power switch on-time $T_{on}$ is greater than or equal to the first reference time $T_{set1}$ and less than the second reference time $T_{set2}$, the target dimming level at a time point that the power switch 110 is turned off is set to the second address at which the second dimming level is stored. Accordingly, when the power switch 110 is turned on again in response to user manipulation, the central processing unit 430 accesses the second address. On the other hand, when the power switch 110 is turned off in a state that the power switch on-time $T_{on}$ is less than the first reference time $T_{set1}$ or is greater than or equal to the second reference time $T_{set2}$, the target dimming level at the time point that the power switch 110 is turned off is maintained at the first address at which the first dimming level is stored. Accordingly, when the power switch 110 is turned on again in response to user manipulation, the central processing unit 430 accesses the first address.

The control signal generation unit 400 as described above may be provided in the form of a Micro Control Unit (MCU), which is provided in the form of a chip through a semiconductor process. In addition, enable signals may be input to the control signal generation unit 400. The enable signals applied from the outside may activate or inactivate the overall operation of the control signal generation unit 400.

In addition, when the central processing unit 430 accesses the memory 420 in the control signal generation unit 400, the target dimming level may be written and stored in the memory 420 by changing the address of the memory 420 in each writing operation. With this structure, it is possible to avoid reduction in lifespan of products due to repeated writing operations in the memory 420. For example, the target dimming level may be stored in a first bank or a first block of the memory 420 in the first writing operation and may be stored in a second bank or a second block of the memory 420 in the second writing operation.

As described above, in the LED lighting device 1000 according to the first embodiment of the invention, luminance of the LED light-emitting unit 600 may be adjusted by controlling the pulse width or duty ratio of dimming control signal $S_{set}$ output from the control signal generation unit 400. In addition, as the operating zone is changed by switching of the power switch 110 in response to user manipulation, current flowing through the LED light-emitting unit 600 is differently set, thereby allowing luminance control of the LED light-emitting unit 600. On the other hand, according to the first embodiment of the invention, the LED dimmer 900 is configured to control luminance of the LED light-emitting unit 600 by outputting dimming control signal $S_{set}$ to the operation current setting unit 500 in the form of the pulse width modulated signal. However, in some embodiments, the control signal generation unit 400 may output analog voltage for directly controlling the gate voltage of the drive transistor Qdr. When the control signal generation unit 400 is realized in this way, the control voltage generator 510 may be omitted among the components shown in FIG. 4.

Figure 8:
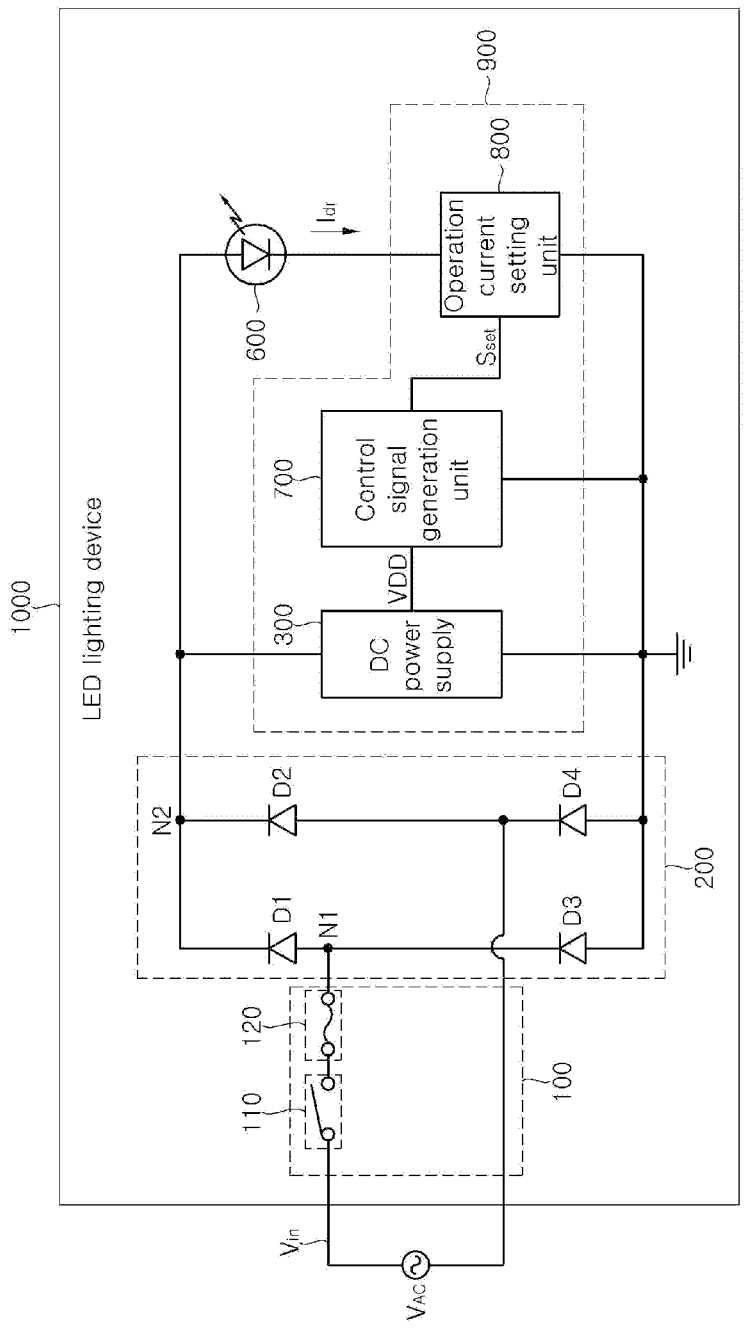
FIG. 8 is a block diagram of an LED lighting device according to a second embodiment of the present invention.

Configuration and Function of LED Lighting Device According to Second Embodiment of the Present Invention FIG. 8 is a block diagram of an LED lighting device 1000 according to a second embodiment of the present invention. An LED dimmer 900 according to the second embodiment of the invention and the LED lighting device 1000 including the same are distinguished from those of the first embodiment in that the LED dimmer according to the second embodiment is configured to output a dimming control signal $S_{set}$ in the form of a digital signal capable of controlling driving of a plurality of transistors according to a dimming level. However, it should be noted that the dimming control algorithm of the LED dimmer 900 according to the second embodiment is substantially the same as that of the LED dimmer 900 described with reference to FIG. 2 and that of the LED dimmer 900 according to the first embodiment described with reference to FIG. 3 to FIG. 7. Thus, the following descriptions of the LED dimmer 900 and the LED lighting device 1000 according to the second embodiment will focus on difference features from those of the LED lighting device 1000 according to the first embodiment, and a repeated description will be omitted.

Referring to FIG. 8, the LED lighting device 1000 according to the second embodiment of the invention may include an AC power supply 100, a rectification unit 200, the LED dimmer 900, and an LED light-emitting unit 600. In addition, the LED dimmer 900 according to the second embodiment of the invention may include a DC power supply 300, a control signal generation unit 700 and an operation current setting unit 800. Construction and functions of the AC power supply 100, the rectification unit 200, the DC power supply 300, the LED light-emitting unit 600 and the LED dimmer 900 are the same as those of the corresponding components of the LED lighting device 1000 according to the first embodiment, and thus will be referred to the descriptions of the corresponding components of the LED lighting device 1000 according to the first embodiment.

The control signal generation unit 700 receives DC voltage VDD from the DC power supply 300. In addition, the control signal generation unit 700 generates a dimming control signal $S_{set}$ corresponding to a selected dimming level. Dimming control signal $S_{set}$ output from the control signal generation unit 700 according to the second embodiment is input to the operation current setting unit 800. At this time, dimming control signal $S_{set}$ output from the control signal generation unit 700 is provided in the form of a signal capable of controlling on/off operation of at least one transistor constituting the operation current setting unit 800.

Specifically, like the control signal generation unit 400 according to the first embodiment, the control signal generation unit 700 according to the second embodiment may determine a dimming level of the current operating zone based on switching of the power switch 110 in response to user manipulation, generate a dimming control signal $S_{set}$ based on the determined dimming level, and output dimming control signal $S_{set}$ to the operation current setting unit 800. More specifically, the control signal generation unit 700 according to this embodiment may generate and output dimming control signal $S_{set}$ according to a different dimming level to the operation current setting unit 800 each time that the power switch 110 is switched in response to user manipulation (that is, each time that the power switch 110 is turned off from an on state to finish the first operating zone in response to user manipulation and then turned on to start the second operating zone in response to user manipulation). Here, it should be noted that the first operating zone and the second operating zone are used as concepts for distinguishing a temporal sequence of the operating zones instead of defining operations zones at specific time points or in specific zones. Thus, when switching of the power switch 110 is performed in response to user manipulation while the control signal generation unit 700 controls the dimming level of the LED lighting device 1000 according to the first dimming level in the first operating zone, the control signal generation unit 700 may control the dimming level of the LED lighting device according to the second dimming level in the second operating zone. In addition, as described above, the control signal generation unit 700 according to the present invention may further determine whether the switching operation of the power switch 110 is valid or invalid based on a first reference time $T_{set1}$ to determine whether to change the dimming level. Further, as described above, the control signal generation unit 700 according to the invention may further determine user-preferred luminance based on a second reference time $T_{set2}$ and may determine whether to change the dimming level based on the determination result. Detailed operation of the control signal generation unit 700 according to the present invention will be described below with reference to FIG. 10 to FIG. 11.

The operation current setting unit 800 sets drive current $I_{dr}$ of the LED light-emitting unit 600 in response to the input dimming control signal $S_{set}$. To this end, the operation current setting unit 800 is electrically connected to a cathode of the light-emitting unit 600. Setting of the drive current $I_{dr}$ by the operation current setting unit 800 is achieved by adjusting resistance.

Figure 9:
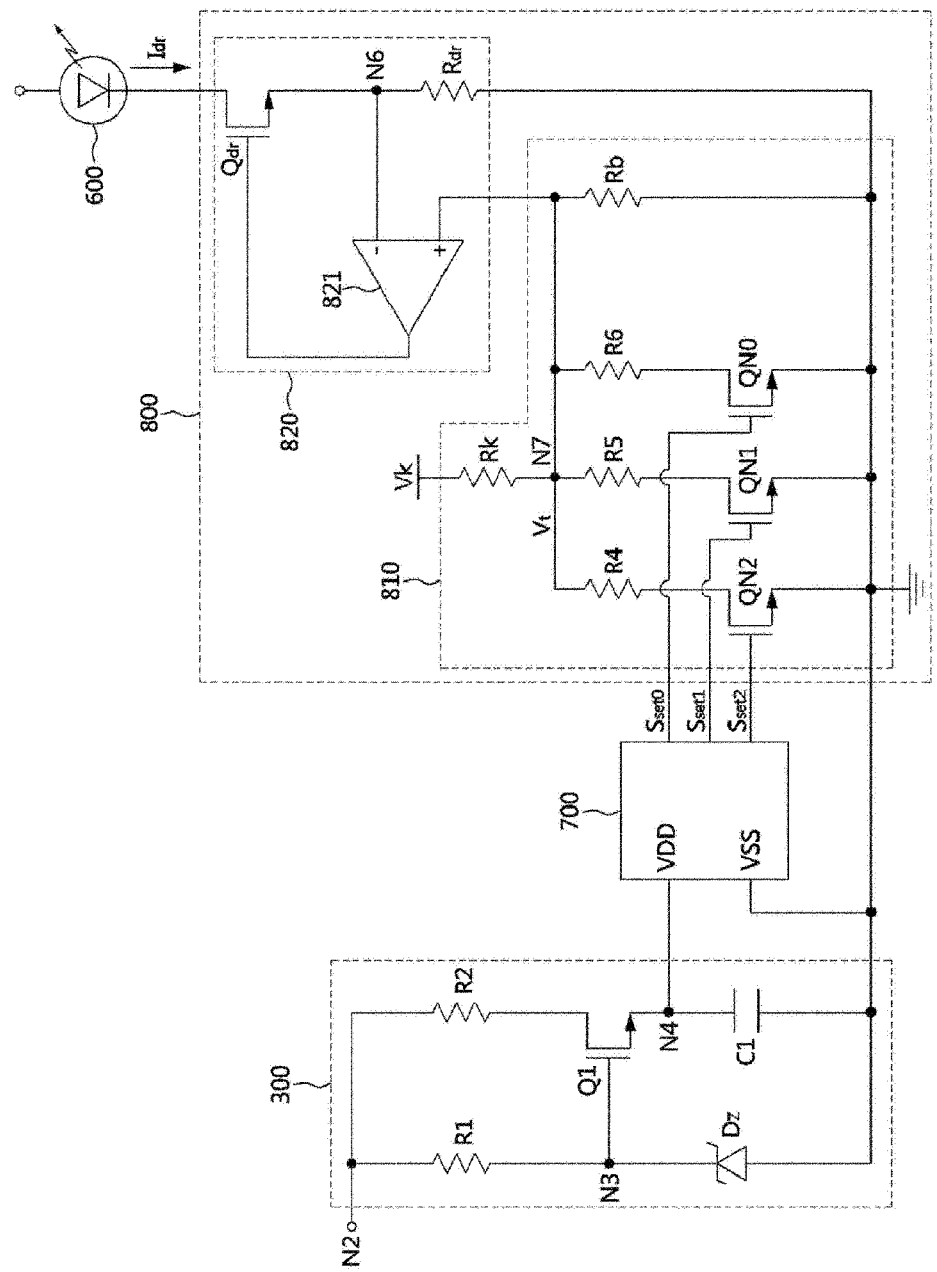
FIG. 9 is a circuit diagram of the LED lighting device according to the second embodiment of the invention, illustrating operation of a control signal generation unit and an operation current setting unit.

FIG. 9 is a circuit diagram of the LED lighting device according to the second embodiment of the invention, illustrating operation of the control signal generation unit 700 and the operation current setting unit 800. As shown in FIG. 9, an output voltage of the DC power supply 300 is used as the DC voltage VDD of the control signal generation unit 700.

Figure 10:
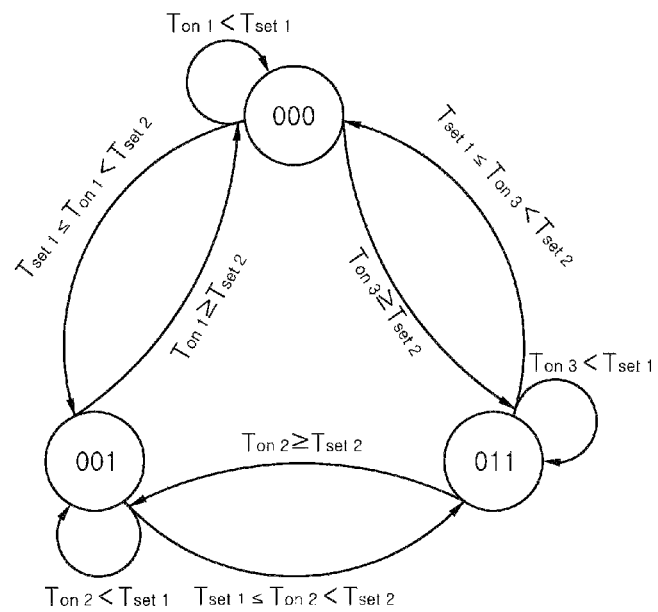
FIG. 10 is a state view illustrating operation of the control signal generation unit according to the second embodiment of the invention.

On the other hand, Table 2 shows relationship between a dimming level of the current operating zone (first operating zone) of the LED lighting device 1000 according to the second embodiment and a dimming level of the next operating zone (second operating zone) of the LED lighting device 1000 based on the power switch on-time $T_{on}$, the first reference time $T_{set1}$ and the second reference time $T_{set2}$. Since the dimming control algorithm of the control signal generation unit 700 according to the second embodiment is substantially the same as that of the control signal generation unit 400 according to the first embodiment, Table 2 is substantially the same as Table 1. Therefore, a repeated description will be omitted. In addition, Table 3 shows relationship between an actual dimming control signal $S_{set}$ output from the control signal generation unit 700 and luminance of the LED light-emitting unit 600 according to the target dimming level. Further, FIG. 10 is a state view illustrating operation of the control signal generation unit according to the second embodiment of the invention, and FIG. 7 is a timing view illustrating operation of the LED lighting device according to the second embodiment of the invention.

Next, the dimming control algorithm of the control signal generation unit 700 according to the second embodiment of the invention will be described in more detail with reference to Table 2, Table 3, and FIG. 9 to FIG. 11.

TABLE 2

| Dimming level of first operating zone | Dimming level of second operating zone | | |
|---|---|---|---|
| | $T_{on} < T_{set1}$ | $T_{set1} \leq T_{on} < T_{set2}$ | $T_{set2} \leq T_{on}$ |
| First dimming level | First dimming level | Second dimming level | First dimming level |
| Second dimming level | Second dimming level | Third dimming level | Second dimming level |
| Third dimming level | Third dimming level | First dimming level | Third dimming level |

In Table 2, the power switch on-time $T_{on}$ refers to a temporal length of the first operating zone of the LED lighting device 1000. That is, in Table 2, the power switch on-time $T_{on}$ means a period of time from a time point that the power switch 110 is turned on to start the first operating zone in response to user manipulation to a time point that the power switch 110 is turned off to finish the first operating zone in response to user manipulation. As shown in Table 2, the dimming level of the second operating zone is determined based on the dimming level of the first operating zone and the power switch on-time $T_{on}$ in the first operating zone.

As shown in Table 2, it can be seen that the dimming level of the second operating zone is set based on the dimming level of the first operating zone and the comparison result of the power switch on-time $T_{on}$ in the first operating zone with the first reference time $T_{set1}$ and the second reference time $T_{set2}$. That is, the dimming level set as the target dimming level at a time point that the first operating zone is finished by turning off of the power switch 110 in response to user manipulation becomes the dimming level of the second operating zone.

Accordingly, when the power switch 110 is turned on again to start the second operating zone in response to user manipulation after a predetermined period of time elapses from the time point that the power switch is turned off to finish the first operating zone in response to user manipulation, the control signal generation unit 700 according to the second embodiment reads a dimming level set as the target dimming level, generates a dimming control signal $S_{Set}$ for performing dimming control according to the read dimming level in the second operating zone, and outputs dimming control signal $S_{set}$ to the operation current setting unit 800.

Referring to FIG. 9, the operation current setting unit 800 according to the second embodiment may include a control voltage generator 810 and a current driver 820.

The control voltage generator 810 is composed of a plurality of transistors QN0, QN1, QN2 and resistors R4, R5, R6, Rb, Rk. Dimming control signals $S_{set0}$, $S_{set1}$, Sset 2 are input to gates of the transistors QN0, QN1, QN2, respectively. In addition, the resistors R4, R5, R6 are connected to drains of the transistors QN0, QN1, QN2, respectively.

The resistors R4, R5, R6 are connected between the drains of the transistors and a seventh node N7. The reference resistor Rk is connected between reference voltage Vk and the seventh node N7. A reference voltage Vk may be supplied from a separate power supply and may be supplied through source voltage of a linear amplifier 821 of the current driver 820.

In addition, an equivalent resistor directed from the seventh node N7 toward ground may be differently set depending upon transistors to be turned on. Control voltage $V_t$, which is a voltage at the seventh node N7, is determined by the equivalent resistor directed from the seventh node N7 toward ground and the reference resistor Rk disposed between the reference voltage Vk and the seventh node N7. This means that the transistors QN0, QN1, QN2 are selectively turned on according to dimming control signal $S_{set}$ and the equivalent resistor varies according to an on/off state of the transistors QN0, QN1, QN2, whereby the control voltage $V_t$ can be controlled.

Further, a base resistor Rb is connected between the seventh node N7 and ground. The base resistor Rb is also connected between a positive input terminal of the linear amplifier 821 and ground. As a result, the base resistor Rb prevents the positive input terminal of the linear amplifier 821 from being set to a ground level.

Further, although this embodiment is illustrated as achieving adjustment of the equivalent resistor directed from the seventh node N7 toward ground through on/off control of three transistors, the number of transistors connected to each other in parallel may be changed, as needed. In addition, values of the resistors connected between the drains of the transistors and the seventh node N7 may be set in various ways depending upon the value of the reference resistor Rk.

The current driver 820 receives the control voltage $V_t$ and determines the drive current $I_{dr}$ of the LED light-emitting unit 600. To this end, the current driver includes the linear amplifier 821, a drive transistor Qdr, and a drive resistor Rdr. The control voltage $V_t$ is applied to a non-inverting input terminal of the linear amplifier 821 and a voltage at a sixth node N6 is applied to an inverting input terminal thereof. The drive transistor Qdr is connected between the LED light-emitting unit 600 and the sixth node N6. A gate of the drive transistor Qdr is connected to an output terminal of the linear amplifier 821. In addition, the drive resistor Rdr is connected between the sixth node N6 and ground.

If a certain level of control voltage $V_t$ is applied and the voltage at the sixth node N6 has a lower voltage level than the control voltage $V_t$, the linear amplifier 821 outputs a positive voltage level, whereby the drive transistor Qdr is turned on. Accordingly, the drive current $I_{dr}$ flowing through the drive transistor Qdr increases. When the drive current $I_{dr}$ increases, the voltage at the sixth node N6 is increased by the drive resistor Rdr. Increase in voltage at the sixth node N6 is continued until the voltage becomes substantially the same as the control voltage $V_t$. This is a phenomenon in which voltages at two input terminals have substantially the same level due to virtual short of an amplifier. That is, the voltage at the sixth node N6 follows the control voltage $V_t$.

Consequently, the control voltage $V_t$ determines the voltage at the sixth node N6 and determines the drive current $I_{dr}$ through the drive resistor Rdr. The drive current $I_{dr}$ flowing through the drive transistor Qdr is $V_t/R_s$.

As described above, the control voltage generator 810 according to the second embodiment is composed of the plurality of transistors. Thus, the control signal generation unit 700 and the control voltage generator 810 according to the second embodiment are configured to allow the plurality of transistors to be selectively turned on/off. Thus, dimming control signal $S_{set}$ is provided in the form of a voltage level capable of turning on/off the transistors of the operation current setting unit 800. That is, dimming control signal $S_{set}$ output from the control signal generation unit 700 is provided in the form of a high level or low level voltage capable of turning on/off the transistors. Accordingly, dimming control signal $S_{set}$ may be provided in the form of a digital signal. Dimming control signal $S_{set}$ having a digital signal form selectively turns on/off the transistors of the operation current setting unit 800.

As described above, Table 3 shows the relationship between an actual dimming control signal $S_{set}$ output from the control signal generation unit 700 and luminance of the LED light-emitting unit 600 according to the target dimming level.

TABLE 3

| Target dimming level set upon start of second operating zone | Dimming control signals $S_{set2}$, $S_{set1}$, $S_{set0}$ after starting second operating zone | Luminance of LED light-emitting unit |
|---|---|---|
| First dimming level | (000) | 100% |
| Second dimming level | (001) | 50% |
| Third dimming level | (011) | 5% |

When the power switch 110 is turned on again to start the second operating zone in response to user manipulation after the first operating zone is finished, the control signal generation unit 700 reads a dimming level set as the target dimming level and outputs a dimming control signal $S_{set}$ corresponding to the dimming level. Thus, as shown in Table 3, when the target dimming level set upon start of the second operating zone is the first dimming level, the control signal generation unit 700 outputs a dimming control signal "000", which corresponds to the first dimming level, to the operation current setting unit 800. In this case, since all of the signals $S_{set0}$ to $S_{set2}$ are low-level voltages, all three of the transistors QN0 to QN2 are turned off. Accordingly, the control voltage $V_t$ has the highest level. Such a first dimming level is a dimming level corresponding to 100% of the maximum luminance of the LED light-emitting unit 600. In addition, when the target dimming level set upon start of the second operating zone is the second dimming level, the control signal generation unit 700 outputs a dimming control signal "001", which corresponds to the second dimming level, to the operation current setting unit 800. Since the signal $S_{set0}$ is a high level voltage and the signals $S_{set1}$ and $S_{set2}$ are low level voltages, the transistor QN0 is turned on and the transistors QN1 to QN2 are maintained in an off state. Accordingly, the control voltage $V_t$ according to the second dimming level becomes lower than the control voltage $V_t$ according to the first dimming level. Such a second dimming level is a dimming level corresponding to 50% of the maximum luminance of the LED light-emitting unit 600. Likewise, when the target dimming level set upon start of the second operating zone is the third dimming level, the control signal generation unit 700 outputs a dimming control signal "011", which corresponds to the third dimming level, to the operation current setting unit 800. Since the signals $S_{set0}$ and $S_{set1}$ are high level voltages and the signal $S_{set2}$ is a low level voltage, two transistors QN0, QN1 are turned on and a single transistor QN2 is maintained in an off state. Accordingly, the control voltage $V_t$ according to the third dimming level becomes lower than the control voltage $V_t$ according to the second dimming level. Such a third dimming level is a dimming level corresponding to 5% of the maximum luminance of the LED light-emitting unit 600.

Furthermore, the control signal generation unit 700 according to the second embodiment may have substantially the same configuration as that of the control signal generation unit according to the first embodiment as shown in FIG. 5. In this case, according to the second embodiment, the pulse width modulator 460 of FIG. 5 is omitted or disabled. In addition, the input/output unit 470 is enabled.

Based on such configuration, operation of the control signal generation unit 700 according to the second embodiment will be described with reference to FIG. 5.

In the memory 420, a target dimming level for generating a dimming control signal $S_{set}$ for a certain operating zone upon turn-on of the power switch 110, that is, upon start of the corresponding operating zone, is stored. The central processing unit 430 sends an access signal of a command type, and the memory outputs the stored target dimming level to the input/output unit 470 in response to the access signal. The input/output unit 470 generates and outputs dimming control signal $S_{set}$ in the form of parallel data. Thus, dimming control signal $S_{set}$ may control on/off operation of the transistors of the control voltage generator 810 in the form of a digital signal. Accordingly, the output control signal $S_{set}$ may be provided in the form of a signal having certain bits in a parallel structure.

With respect to the memory which outputs dimming control information, the central processing unit 430 may perform writing operation for a new target dimming level. This operation is carried out as shown in Tables 2 and 3. Briefly, the central processing unit 430 compares power switch on-time $T_{on}$ input from the timer 450 with a preset first reference time $T_{set1}$ and a preset second reference time $T_{set2}$.

If the power switch on-time $T_{on}$ measured by the timer 450 is less than the first reference time $T_{set1}$, the central processing unit 430 maintains the target dimming level stored in the memory 420. When the power switch on-time $T_{on}$ measured by the timer 450 reaches the first reference time $T_{set1}$, the central processing unit 430 changes the target dimming level stored in the memory 420 to a dimming level next to the dimming level of the current operating zone and stores the changed dimming level. Further, when the power switch on-time $T_{on}$ measured by the timer 450 reaches the second reference time $T_{set2}$, the central processing unit 430 again changes the target dimming level stored in the memory 420 from the dimming level next to the dimming level of the current operating zone to the dimming level of the current operating zone, and stores and maintains the dimming level of the current operating zone as the target dimming level.

On the other hand, as in the first embodiment, the aforementioned operation may be realized in a different way. For example, at each of specific addresses of the memory 420, corresponding dimming levels are constructed and stored. Specifically, a first dimming level corresponding to a duty ratio of 100% is stored at a first address; a second dimming level corresponding to a duty ratio of 50% is stored at a second address; and a third dimming level corresponding to a duty ratio of 5% is stored at a third address. As a result, the target dimming level may be set in such a way that an address is designated for a specific dimming level.

For example, it is assumed that a target dimming level is stored at the first address at a time point of finishing a previous operating zone. When the power switch 110 is turned on to start the operating zone, the central processing unit 430 accesses the first address and outputs the dimming level stored at the first address as the dimming level of the current operating zone. The power switch on-time $T_{on}$ measured by the timer 450 is compared with the first reference time $T_{set1}$ and the second reference time $T_{set2}$ by the central processing unit 430 and it is determined according to the comparison result whether to change the address for setting the target dimming level. When the power switch 110 is turned off in a state that the power switch on-time $T_{on}$ is greater than or equal to the first reference time $T_{set1}$ and less than the second reference time $T_{set2}$, the target dimming level at a time point that the power switch 110 is turned off is set to the second address at which the second dimming level is stored. Accordingly, when the power switch 110 is turned on again in response to user manipulation, the central processing unit 430 accesses the second address. On the other hand, when the power switch 110 is turned off in a state that the power switch on-time $T_{on}$ is less than the first reference time $T_{set1}$ or is greater than or equal to the second reference time $T_{set2}$, the target dimming level at the time point that the power switch 110 is turned off is maintained at the first address in which the first dimming level is stored. Accordingly, when the power switch 110 is turned on again in response to user manipulation, the central processing unit 430 accesses the first address.

In addition, the control signal generation unit 700 may be provided in the form of a Micro Control Unit (MCU), which is provided in the form of a chip. Further, enable signals may be input to the control signal generation unit 700. The enable signals may activate or inactivate the operation of the control signal generation unit 700.

In addition, when the central processing unit 430 accesses the memory 420 in the control signal generation unit 700, the target dimming level may be written and stored in the memory 420 by changing the address of the memory 420 in each writing operation. With this structure, it is possible to avoid reduction in lifespan of products due to repeated writing operations of the memory 420. For example, the target dimming level may be stored in a first bank or a first block of the memory 420 in the first writing operation and may be stored in a second bank or a second block of the memory 420 in the second writing operation.

FIG. 10 schematically shows a target dimming level setting algorithm of the control signal generation unit 700 according to the second embodiment of the invention. FIG. 11 shows six operating zones including a first operating zone (t1~t2), a second operating zone (t3~t4), a third operating zone (t5~t6), a fourth operating zone (t7~t8), a fifth operating zone (t9~t10) and a sixth operating zone (t11~t12), a voltage level of the first node (N1), an operation state of the power switch 110, a dimming control signal $S_{set}$ output from the control signal generation unit 400 in a corresponding operating zone, control voltage $V_t$, and the like. The timing view related to the control signal generation unit 400 according to the first embodiment shown in FIG. 7 is the same as that of the control signal generation unit 700 according to the second embodiment excluding the form of dimming control signal $S_{set}$, and thus a repeated description will be omitted.

Figure 11:
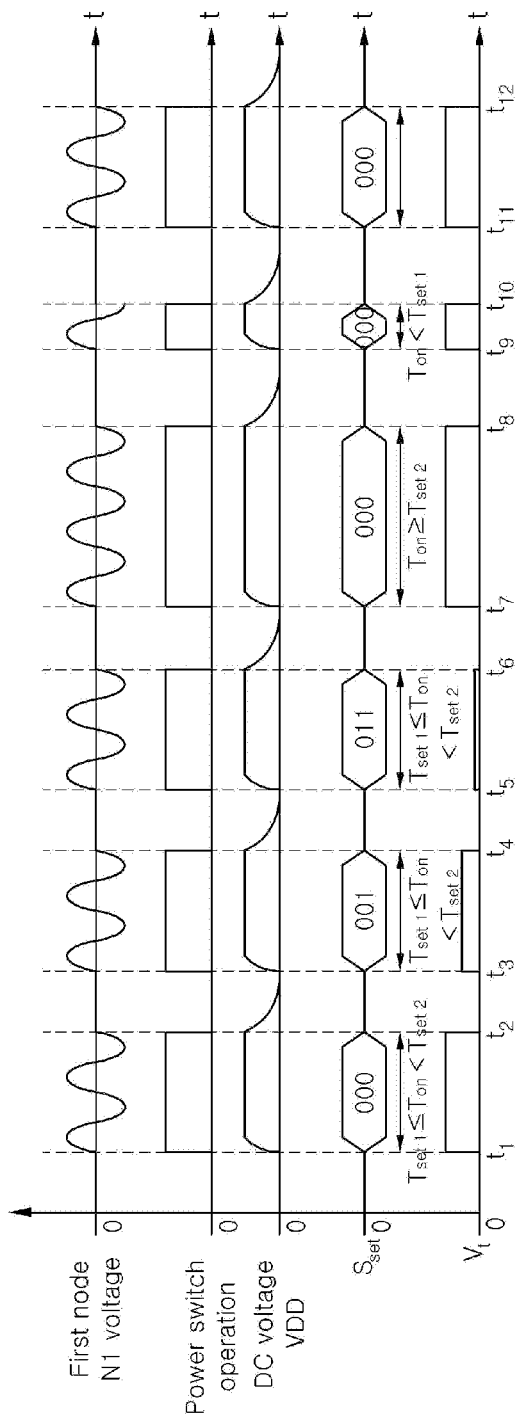
FIG. 11 is a timing view illustrating operation of the LED lighting device according to the second embodiment of the invention.

In the timing view of FIG. 11, the target dimming level of the first operating zone is set to the first dimming level and is stored in the memory. Thus, when the power switch 110 is turned on to start the first operating zone in response to user manipulation at a time point t1, the control signal generation unit 700 generates and outputs a dimming control signal $S_{set}$, which corresponds to the first dimming level set as the target dimming level, to the operation current setting unit 800. As described above, the control signal generation unit 700 according to the second embodiment may output dimming control signal $S_{set}$ in the form of a digital signal for controlling driving of the plurality of transistors. Thus, in some embodiments, the dimming level may be composed of a digital signal and stored in the memory. In this case, the first dimming level may be a digital signal having a value "000", the second dimming level may be a digital signal having a value "001", and the third dimming level may be a digital signal having a value "011". When the dimming levels are provided in this way, the control signal generation unit 700 may be configured to read the target dimming level stored in the memory instead of generating dimming control signal $S_{set}$ corresponding to the target dimming level and to output the read target dimming level as dimming control signal $S_{set}$. Accordingly, when the power switch 110 is turned on to start the first operating zone in response to user manipulation at the time point t1, the control signal generation unit 700 outputs the first dimming level (000) set as the target dimming level to the operation current setting unit 800. In addition, at the time point t1, the power switch on-time $T_{on}$ starts to be measured. At a time point t2, the power switch 110 is turned off in response to user manipulation, whereby the first operating zone is finished. Since the power switch on-time $T_{on}$ of the first operating zone is greater than or equal to the first reference time $T_{set1}$ and less than the second reference time $T_{set2}$, the target dimming level at the time point of finishing the first operating zone is the second dimming level. Accordingly, at a time point t3, when the power switch 110 is turned on again to start the second operating zone in response to user manipulation, the control signal generation unit 700 outputs the second dimming level (001), which is set as the target dimming level, to the operation current setting unit 800, as dimming control signal Sset. As shown in FIG. 11, since the power switch on-time $T_{on}$ of the second operating zone is greater than or equal to the first reference time $T_{set1}$ and less than the second reference time $T_{set2}$, the target dimming level at a time point t4 that the second operating zone is finished is the third dimming level. Accordingly, in the third operating zone, dimming control of the LED lighting device 1000 is performed according to the third dimming level (011). Further, as shown in the drawing, since the power switch on-time $T_{on}$ of the third operating zone is greater than or equal to the first reference time $T_{set1}$ and less than the second reference time $T_{set2}$, the target dimming level at a time point t6 that the third operating zone is finished is the first dimming level. Accordingly, in the fourth operating zone, dimming control of the LED lighting device 1000 is performed according to the first dimming level (000). On the other hand, unlike the first operating zone to the third operating zone, the power switch on-time $T_{on}$ in the fourth operating zone is greater than or equal to the second reference time $T_{set2}$. Accordingly, based on the aforementioned algorithm, the dimming level of the fourth operating zone, that is, the first dimming level (000), is determined as user-preferred luminance, and the first dimming level (000) is maintained as the target dimming level at a time point t8 that the fourth operating zone is finished. Accordingly, in the fifth operating zone, dimming control of the LED lighting device 1000 is performed according to the first dimming level (000) as in the fourth operating zone. Further, unlike the first operating zone to the fourth operating zone, the power switch on-time $T_{on}$ in the fifth operating zone is less than the first reference time $T_{set1}$. Accordingly, at a time point t10 that the fifth operating zone is finished, the first dimming level (000) is maintained as the target dimming level. As a result, in the sixth operating zone, dimming control of the LED lighting device 1000 is performed according to the first dimming level (000) as in the fifth operating zone.

In this embodiment, luminance control of the LED light-emitting unit 600 is determined by the switching operation of the transistors QN0 to QN2 of the operation current setting unit 800. The switching operation of the transistors QN0 to QN2 of the operation current setting unit 800 is achieved by the control signals $S_{set0}$ to $S_{set2}$ of the control signal generation unit 700.

According to the above two embodiments, dimming control signal may be provided in the form of a pulse width modulated signal or in the form of a gate dimming control signal capable of selecting resistance. The pulse width modulated signal sets the level of control voltage and the drive current $I_{dr}$ of the light-emitting unit is determined according to the set control voltage. In addition, driver current for driving the LED light-emitting unit 600 is set according to the target dimming level after switching of the power switch 110.

Figure 12:
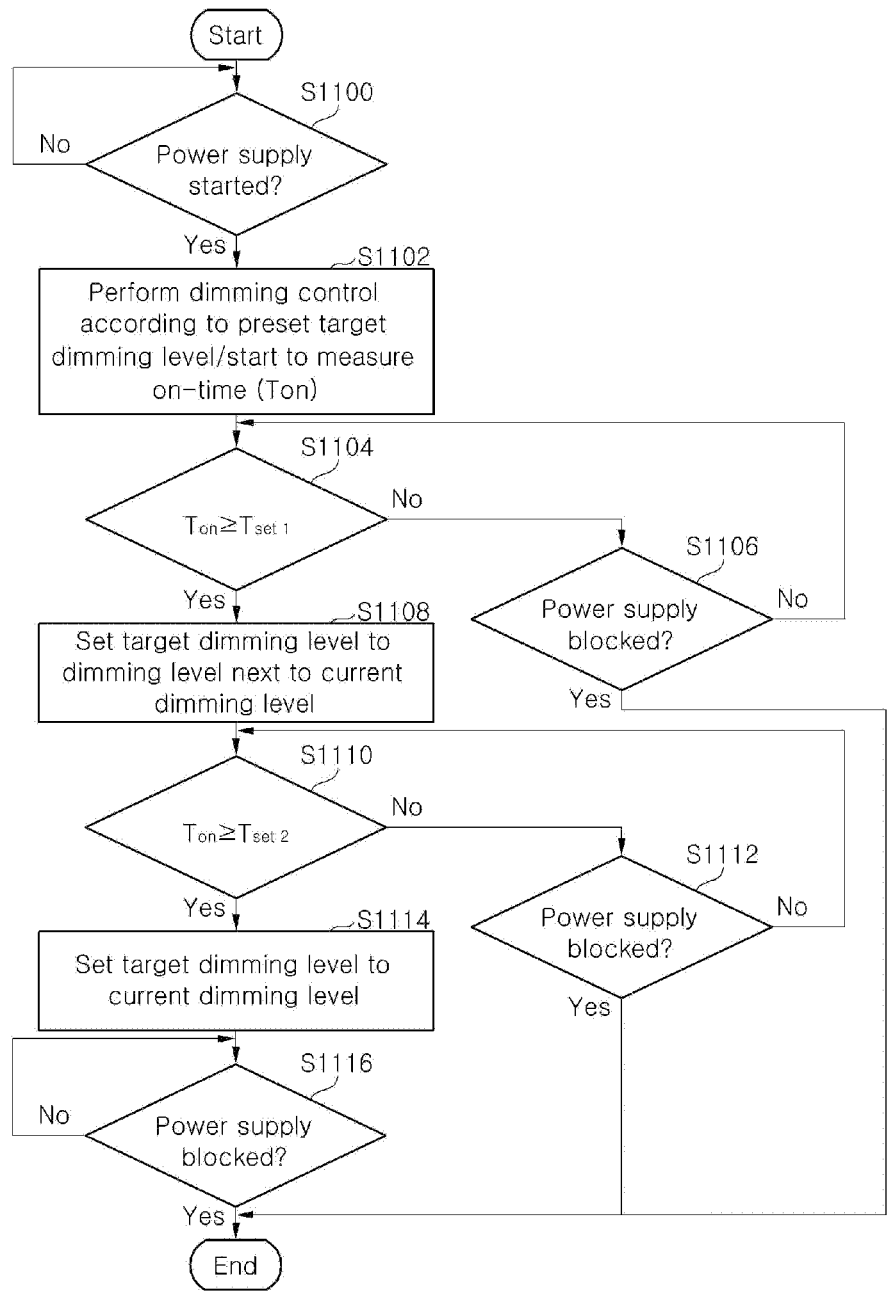
FIG. 12 is a flowchart illustrating a dimming control process of an LED lighting device according to one exemplary embodiment of the present invention.

Example of Dimming Control of LED Lighting Device According to One Embodiment of the Present Invention FIG. 12 is a flowchart illustrating a dimming control process of an LED lighting device according to one exemplary embodiment of the present invention. Hereinafter, referring to FIG. 12, a dimming control process of the LED lighting device 1000 according to the present invention will be described in detail.

For convenience of description and better understanding, the embodiment shown in FIG. 12 will be described with reference to the LED lighting device 1000 according to the first embodiment of the invention, and it is assumed that the power switch 110 is turned off and the first operating zone is finished in response to user manipulation immediately before S1100, and a target dimming level at a time point of finishing the first operating zone is set to the second dimming level.

First, the LED dimmer 900 determines whether the power switch 110 is turned on in response to user manipulation (S110). Various techniques known in the art may be adopted to determine whether the power switch 110 is turned on and/or turned off. For example, the LED dimmer 900 according to the present invention may be configured to detect an operation state of the power switch 110 based on whether rectified voltage $V_{rec}$ is supplied from the rectification unit 200. When power supply starts according to a determination result in S1100, the LED dimmer 900 reads the preset target dimming level and performs luminance control in the corresponding operating zone, that is, in the second operating zone, according to the read target dimming level (S1102). As described above, since the second dimming level is set as the target dimming level, the LED dimmer 900 controls luminance of the LED lighting device 1000 according to the second dimming level. At the same time, the LED dimmer 900 starts to measure power switch on-time $T_{on}$ (S1102).

While the LED lighting device 1000 is driven in the second operating zone, measurement of the power switch on-time $T_{on}$ is continued. The LED dimmer 900 compares the measured power switch on-time $T_{on}$ with the first reference time $T_{set1}$ (S1104), and changes the target dimming level currently set to the second dimming level to the third dimming level and stores the third dimming level, when the measured power switch on-time $T_{on}$ reaches the first reference time $T_{set1}$ (S1108).

On the other hand, the LED dimmer 900 continues to determine whether power supply is blocked, that is, whether the power switch 110 is turned off in response to user manipulation (S1106, S1112, S1116). When the power switch 110 is turned off to finish the second operating zone at a time point that the power switch on-time $T_{on}$ is less than the first reference time $T_{set1}$ (S1106), the LED dimmer 900 finishes the procedure. At this time, the target dimming level at a time point of starting the second operating zone and the target dimming level at a time point of finishing the second operating zone are the same second dimming level. Accordingly, in this case, even when the power switch 110 is turned on again to start the third operating zone in response to user manipulation, the LED dimmer 900 performs dimming control of the LED lighting device 1000 in the third operating zone according to the second dimming level, since the target dimming level is set to the second dimming level.

On the other hand, when the power switch 110 is turned off to finish the second operating zone at a time point that the power switch on-time $T_{on}$ is greater than or equal to the first reference time $T_{set1}$ and less than the second reference time $T_{set2}$ (S1112), the target dimming level at the time point of starting the second operating zone is the second dimming level and the target dimming level at the time point of finishing the second operating zone is the third dimming level, and thus are different from each other. Accordingly, in this case, when the power switch 110 is turned on again to start the third operating zone in response to user manipulation, the LED dimmer 900 performs dimming control of the LED lighting device 1000 in the third operating zone according to the third dimming level, which is the target dimming level at the time point of finishing the second operating zone.

In addition, when the second operating zone is continued until the power switch on-time $T_{on}$ reaches the second reference time $T_{set2}$, the LED dimmer 900 determines the dimming level of the second operating zone as user-preferred luminance. Thus, at a time point that the power switch on-time $T_{on}$ reaches the second reference time $T_{set2}$, the LED dimmer 900 changes and sets the target dimming level, which has been set to the third dimming level in S1108, to the second dimming level (S1114). Accordingly, when the power switch 110 is turned off to finish the second operating zone at a time point that the power switch on-time $T_{on}$ is greater than or equal to the second reference time $T_{set2}$ (S1116), the target dimming level at the time point of starting the second operating zone and the target dimming level at the time point of finishing the second operating zone are the same second dimming level. Accordingly, in this case, even when the power switch 110 is turned on again to start the third operating zone in response to user manipulation, the LED dimmer 900 performs dimming control of the LED lighting device 1000 in the third operating zone according to the second dimming level as in the second operating zone.

Although some embodiments have been described above, the present invention is not limited to the aforementioned embodiments and features, and various modifications, changes, and alterations can be made without departing from the spirit and scope of the invention.

The invention claimed is:

1. A light-emitting diode (LED) dimmer for an LED lighting device, comprising:
   a power switch;
   a drive voltage supply; and
   an LED light-emitting unit,
   wherein, when operating zones of the LED lighting device are changed due to switching the power switch;
   the LED dimmer is configured to select a first dimming level of $(k+1)^{th}$ operating zone after switching the power switch, k being a positive integer;
   the first dimming level being different than a second dimming level of a $k^{th}$ operating zone before switching the power switch; and
   the LED dimmer is configured to controls luminance of the LED light-emitting unit according to the second dimming level in the $k^{th}$ operating zone.

2. The LED dimmer of claim 1, wherein:
   the LED dimmer further comprises a dimming level group comprising a first dimming level to an $n^{th}$ dimming level, n being a positive integer of 2 or greater, which are sequentially constructed and stored according to sizes of the dimming levels; and
   the LED dimmer is configured to sequentially change the dimming level within the dimming level group and control luminance of the LED light-emitting unit in a specific operating zone according to the changed dimming level, as the operating zones are changed due to switching the power switch.

3. The LED dimmer according to claim 2, wherein, when the power switch is turned on to start the $k^{th}$ operating zone, a target dimming level is set to an $i^{th}$ dimming level, i being a positive integer of n or less, the LED dimmer is configured to:
   read the target dimming level;
   control luminance of the LED light-emitting unit according to the $i^{th}$ dimming level read as the target dimming level in the $k^{th}$ operating zone; and
   set the target dimming level to an $(i+1)^{th}$ dimming level immediately after controlling luminance of the LED light-emitting unit according to the $i^{th}$ dimming level.

4. The LED dimmer of claim 3, wherein the LED dimmer is further configured to:
   measure power switch on-time as soon as the power switch is turned on to start the $k^{th}$ operating zone; and
   set the target dimming level to the $(i+1)^{th}$ dimming level at a time point that the measured power switch on-time reaches a preset first reference time.

5. The LED dimmer of claim 3, wherein the LED dimmer is further configured to:
   measure power switch on-time as soon as the power switch is turned on to start the $k^{th}$ operating zone; and reset the target dimming level, which has been set to the $(i+1)^{th}$ dimming level, to the $i^{th}$ dimming level at a time point that the measured power switch on-time reaches a preset second reference time.

6. The LED dimmer of claim 3, wherein the LED dimmer is further configured to:
measure power switch on-time as soon as the power switch is turned on to start the $k^{th}$ operating zone;
set the target dimming level to the $(i+1)^{th}$ dimming level at a time point that the measured power switch on-time reaches a preset first reference time; and
reset the target dimming level, which has been set to the $(i+1)^{th}$ dimming level, to the $i^{th}$ dimming level at a time point that the measured power switch on-time reaches a preset second reference time, the second reference time being greater than the first reference time.

7. A light-emitting diode (LED) lighting device, comprising:
a power switch connected between an AC power source and a rectification unit the power switch configured to selectively output AC voltage supplied from the AC power source;
a drive voltage supply connected to the power switch, the drive voltage supply configured to generate a drive voltage through treatment of the AC voltage output through the power switch, and output the drive voltage to an LED light-emitting unit and an LED dimmer;
wherein:
the LED dimmer is configured to select a first dimming level of a $(k+1)^{th}$ operating zone after switching the power switch, k being a positive integer;
the first dimming level being different than a second dimming level of a $k^{th}$ operating zone before switching the power switch;
the LED dimmer is configured to control luminance of the LED light-emitting unit according to the second dimming level in the $k^{th}$ operating zone, when operating zones of the LED lighting device are changed due to switching the power switch; and
the LED light-emitting unit is configured to emit light under control of the LED dimmer.

8. The LED light emitting device of claim 7, wherein the drive voltage supply comprises a rectification unit configured to perform full-wave rectification of the AC voltage and output a full-wave rectified voltage to the LED light-emitting unit and the LED dimmer.

9. The LED light emitting device of claim 7, wherein:
the LED dimmer further comprises a dimming level group comprising a first dimming level to an $n^{th}$ dimming level, n being a positive integer of 2 or greater, which are sequentially constructed and stored according to sizes of the dimming levels; and
the LED dimmer is configured to sequentially changes the dimming level within the dimming level group and control luminance of the LED light-emitting unit in a specific operating zone according to the changed dimming level, as the operating zones are changed due to switching the power switch.

10. The LED light emitting device of claim 9, wherein, when the power switch is turned on to start the $k^{th}$ operating zone, a target dimming level is set to an $i^{th}$ dimming level, i being a positive integer of n or less, the LED dimmer is configured to:
read the target dimming level;
control luminance of the LED light-emitting unit according to the $i^{th}$ dimming level read as the target dimming level in the $k^{th}$ operating zone; and
set the target dimming level to an $(i+1)^{th}$ dimming level immediately after controlling luminance of the LED light-emitting unit according to the $i^{th}$ dimming level.

11. The LED light emitting device of claim 10, wherein the LED dimmer is further configured to:
measure power switch on-time as soon as the power switch is turned on to start the $k^{th}$ operating zone; and
set the target dimming level to the $(i+1)^{th}$ dimming level that the measured power switch on-time reaches a preset first reference time.

12. The LED light emitting device of claim 10, wherein the LED dimmer is further configured to:
measure power switch on-time as soon as the power switch is turned on to start the $k^{th}$ operating zone; and
reset the target dimming level, which has been set to the $(i+1)^{th}$ dimming level, to the $i^{th}$ dimming level at a time point that the measured power switch on-time reaches a preset second reference time.

13. The LED light emitting device of claim 10, wherein the LED dimmer is further configured to:
measure power switch on-time as soon as the power switch is turned on to start the $k^{th}$ operating zone;
set the target dimming level to the $(i+1)^{th}$ dimming level at a time point that the measured power switch on-time reaches a first reference time; and
reset the target dimming level, which has been set to the $(i+1)^{th}$ dimming level, to the $i^{th}$ dimming level at a time point that the measured power switch on-time reaches a second reference time, the second reference time being greater than the first reference time.

14. A control method for dimming control of a light-emitting diode (LED) light emitting device, comprising:
a power switch;
a drive voltage supply;
an LED dimmer; and
an LED light-emitting unit, the method comprising:
(a) determining whether the power switch is turned on;
(b) when the power switch is turned on, reading a target dimming level and starting control of luminance of the LED light-emitting unit according to the target dimming level to start a $k^{th}$ operating zone, k being a positive integer;
(c) changing the target dimming level to a second dimming level next to the target dimming level, immediately after starting control of luminance of the LED light-emitting unit; and
(d) determining whether the power switch is turned off, and finishing the $k^{th}$ operating zone when the power switch is turned off,
wherein the target dimming level changed and set as the second dimming level in Step (c) becomes a target dimming level in a $(k+1)^{th}$ operating zone.

15. The control method of claim 14, wherein the LED dimmer further comprises a dimming level group comprising a first dimming level to an $n^{th}$ dimming level, n being a positive integer of 2 or greater, which are sequentially constructed and stored according to sizes of the dimming levels, and
the method further comprises:
sequentially changing the dimming level within the dimming level group and controlling luminance of the LED light-emitting unit in a specific operating zone according to the changed dimming level, as the operating zones are changed due to switching the power switch by performing Steps (a) to (d).

16. The control method of claim 15, wherein:
when a $(k-1)^{th}$ operating zone before Step (a) is finished, the target dimming level is set to an $i^{th}$ dimming level, i being a positive integer of n or less, in the $k^{th}$ operating zone;
Step (b) further comprises reading the target dimming level when the $k^{th}$ operating zone is started, and starting control of luminance of the LED light-emitting unit according to the $i^{th}$ dimming level; and Step (c) further comprises setting the target dimming level to an $(i+1)^{th}$ dimming level.

17. The control method of claim 16, wherein:

Step (b) further comprises measuring power switch on-time as soon as the power switch is turned on to start the $k^{th}$ operating zone;

Step (c) further comprises setting the target dimming level to the $(i+1)^{th}$ dimming level at a time point that the measured power switch on-time reaches a first reference time.

18. The control method of claim 16, wherein:

Step (b) further comprises measuring power switch on-time as soon as the power switch is turned on to start the $k^{th}$ operating zone; and Step (c) further comprises resetting the target dimming level, which has been set to the $(i+1)^{th}$ dimming level, to the $i^{th}$ dimming level at a time point that the measured power switch on-time reaches a second reference time.

19. The control method of claim 16, wherein:

Step (b) further comprises measuring power switch on-time as soon as the power switch is turned on to start the $k^{th}$ operating zone;

Step (c) further comprises:
- (c-1) setting the target dimming level to the $(i+1)^{th}$ dimming level at a time point that the measured power switch on-time reaches a first reference time; and
- (c-2) resetting the target dimming level, which has been set to the $(i+1)^{th}$ dimming level, to the $i^{th}$ dimming level at a time point that the measured power switch on-time reaches a second reference time, the second reference time being longer than the first reference time.

* * * * *